US012172366B1

(12) United States Patent
Wallin et al.

(10) Patent No.: US 12,172,366 B1
(45) Date of Patent: Dec. 24, 2024

(54) SYSTEMS, METHODS, AND DEVICES FOR VOLUMETRIC PRINTING OF SOLID STATE POLYMER RESIN

(71) Applicant: META PLATFORMS TECHNOLOGIES, LLC, Menlo Park, CA (US)

(72) Inventors: Thomas John Farrell Wallin, Kirkland, WA (US); Lincoln Ghioni, Redmond, WA (US)

(73) Assignee: META PLATFORMS TECHNOLOGIES, LLC

( * ) Notice: Subject to any disclaimer, the term of this patent is extended or adjusted under 35 U.S.C. 154(b) by 402 days.

(21) Appl. No.: 17/458,119

(22) Filed: Aug. 26, 2021

Related U.S. Application Data

(60) Provisional application No. 63/070,751, filed on Aug. 26, 2020.

(51) Int. Cl.
*B29C 64/268* (2017.01)
*B29C 35/08* (2006.01)
(Continued)

(52) U.S. Cl.
CPC ........ *B29C 64/135* (2017.08); *B29C 35/0805* (2013.01); *B29C 64/241* (2017.08);
(Continued)

(58) Field of Classification Search
CPC ... B29C 64/129; B29C 64/135; B29C 64/264; B29C 64/268; B29C 64/273;
(Continued)

(56) References Cited

U.S. PATENT DOCUMENTS 11,400,698 B2 * 8/2022 Ermoshkin ........... B29C 64/232
2017/0087765 A1 3/2017 Rundlett et al.
(Continued)

FOREIGN PATENT DOCUMENTS

CN 102725689 A 10/2012
CN 104559196 A 4/2015
(Continued)

OTHER PUBLICATIONS

European Search Report for European Application No. 21174427.1, dated Oct. 5, 2021, 2 pages.
(Continued)

*Primary Examiner* — Philip C Tucker
*Assistant Examiner* — Jimmy R Smith, Jr.
(74) *Attorney, Agent, or Firm* — Morgan, Lewis & Bockius LLP

(57) ABSTRACT

The disclosure provides systems for 3D printing. A 3D printer system includes one or more sources of actinic radiation characterized at least by a powered state and an unpowered state. A resin enclosure is transmissive to the actinic radiation. A temperature control system thermally communicates with the resin enclosure and maintains the resin enclosure at a predetermined sub-ambient chilled state. A control circuit is in electrical communication with the sources of actinic radiation and the temperature control system. The control circuit includes first non-transitory logic to switch the sources of actinic radiation to the powered state when one or more threshold criteria is satisfied including a requirement the temperature control system is in a predetermined state causing the resin enclosure to be below a temperature. A second non-transitory logic switches the sources of actinic radiation to the unpowered state when one or more threshold criteria is not satisfied.

28 Claims, 7 Drawing Sheets

(51) Int. Cl.
*B29C 64/135* (2017.01)
*B29C 64/241* (2017.01)
*B29C 64/255* (2017.01)
*B29C 64/277* (2017.01)
*B33Y 30/00* (2015.01)
*B33Y 50/02* (2015.01)
*B33Y 10/00* (2015.01)

(52) U.S. Cl.
CPC .......... *B29C 64/255* (2017.08); *B29C 64/268* (2017.08); *B29C 64/277* (2017.08); *B33Y 10/00* (2014.12); *B33Y 30/00* (2014.12); *B33Y 50/02* (2014.12)

(58) Field of Classification Search
CPC ... B29C 64/277; B29C 64/282; B29C 64/286; B29C 64/291; B29C 71/04; B29C 64/364; B29C 64/30; B29C 64/307; B29C 64/25; B29C 64/386; B29C 64/393; B29C 64/255; B29C 64/241; B33Y 40/00; B33Y 50/02
See application file for complete search history.

(56) References Cited

U.S. PATENT DOCUMENTS

| | | |
|---|---|---|
| 2017/0283655 A1 | 10/2017 | Kenney et al. |
| 2018/0015672 A1* | 1/2018 | Shusteff ................ B29C 64/264 |
| 2018/0244854 A1 | 8/2018 | Drazba et al. |
| 2019/0351609 A1* | 11/2019 | Thau ..................... B29C 64/268 |
| 2020/0032062 A1 | 1/2020 | Wallin et al. |
| 2022/0184885 A1 | 6/2022 | Schaffner |

FOREIGN PATENT DOCUMENTS

| | | |
|---|---|---|
| CN | 106132655 A | 11/2016 |
| CN | 106317898 A | 1/2017 |
| CN | ZL2019800776460 | 5/2022 |
| WO | 2011091228 A1 | 7/2011 |
| WO | 2015148613 A1 | 10/2015 |
| WO | 2016044547 A1 | 3/2016 |
| WO | 2018026829 A1 | 2/2018 |

OTHER PUBLICATIONS

Final Office Action mailed Mar. 6, 2023 for U.S. Appl. No. 17/313,731, filed May 6, 2021, 12 pages.

Non-Final Office Action mailed Sep. 6, 2022 for U.S. Appl. No. 17/313,731, filed May 6, 2021, 13 pages.

Office Action mailed Jul. 4, 2022 for Chinese Application No. 202110546696.8, filed May 19, 2021, 14 pages.

Office Action mailed Jan. 5, 2023 for Chinese Application No. 202110546696.8, filed May 19, 2021, 11 pages.

Office Action mailed Apr. 8, 2023 for Chinese Application No. 202110546696.8, filed May 19, 2021, 13 pages.

* cited by examiner

SYSTEMS, METHODS, AND DEVICES FOR VOLUMETRIC PRINTING OF SOLID STATE POLYMER RESIN

CROSS-REFERENCE TO RELATED PATENT APPLICATION

The present application claims priority to U.S. Provisional Patent Application No. 63/070,751, entitled "Volumetric Printing of Solid State Polymer Resin," filed Aug. 26, 2020, which is hereby incorporated by reference in its entirety.

TECHNICAL FIELD

This disclosure relates to additive manufacturing. More particularly, the present disclosure relates to using systems and methods for three-dimensional ("3D") printing using temperature modulation.

BACKGROUND

Conventional vat polymerization 3D printing techniques possess the ability to rapidly cure a solid object from within a vat of photopolymer resin. Such techniques include stereolithography (SLA), digital light processing (DLP), continuous liquid interface printing (CLIP), holographic printing, tomographic printing, 2-photon polymerization (2PP), and the like. These manufacturing techniques are particularly attractive for fabricating an object with complex geometries including micron scaled features due, in part, to a spatial-temporal resolution of light, a buoyant support provided by liquid resin, and rapid deposition rates that are provided through such techniques. However, all of these techniques rely on a translation of the printed object during the build process. Moreover, the need for liquid replenishment requires a low viscosity resin (e.g., an apparent viscosity of less than 10 Pascal-seconds (Pa·s) at 1 Hertz (Hz)).

By comparison, volumetric additive manufacturing (VAM) techniques use holography or tomography to project a 3D photopattern with appropriate photodose to yield the entire object in a single exposure step. Thus, when using VAM techniques, there is no need for resin replenishment and no requirements on a viscosity of the resin. However, VAM techniques require materials that exhibit unique photochemical behavior. In particular, there is a balance between an absorptivity of a resin and an induction period, which is characterized by photodosage prior to appreciable gelation. Moreover, an applied photopattern needs to penetrate deeply into the resin to provide a proper cumulative photodose in target voxels without inducing gelation in undesired areas. As such, conventional materials with structural features that scatter light lack a sufficient penetration depth for VAM printing.

Given the above background, systems, methods, and devices are needed that enable rapid manufacture of objects using 3D techniques. In particular, there is a need for enabling the manufacture of objects using 3D techniques that include thermal modulation in order to produce higher quality objects.

SUMMARY

The present disclosure addresses the above-identified shortcomings.

The present disclosure provides improved systems, methods, and devices for manufacturing an object at a 3D printer system that includes a temperature control system that is configured to modulate a temperature of the 3D printer system. By modulating the temperature of the 3D printer system, a very low temperature is achieved (e.g., from about 4° C. to about-269° C.). This very low temperature strongly constrains a movement of polymer chains of a resin of the 3D printer system, from which the object is formed by, which yields a high strength polymer. Advantageously, by constraining the movement of the polymer chains of the resin, increased accuracy when manufacturing the object at the 3D printer system is provided. For instance, gravitational forces, buoyancy, convection, and the fluid dynamics associated with these parameters make delivery of sufficient light dosage on a particular voxel without movement of the object difficult, which is resolved by using the temperature control system of the 3D printer system to eliminate these parameters as sources of error.

In one aspect of the present disclosure, systems, methods, and devices are directed to a 3D printer system. The 3D printer system includes one or more sources of actinic radiation that, in some embodiments, activate a photopolymerization effect of a resin. In some embodiments, a respective source of actinic radiation of the 3D printer system emits light in a range from about 300 nanometers (nm) to about 500 nm, to about 365 nm, or to about 405 nm of light. Moreover, in some such embodiments, the respective source of actinic radiation is a laser, a light emitting diode, or a projector, which, optionally, includes a digital micromirror device (DMD) to alter a cross section of the emitted light from the respective source of actinic radiation. The 3D printer system includes a resin enclosure, which is configured to accommodate a resin, such as an uncrosslinked polymeric resin in a liquid or a solid state. The resin enclosure is made of a transmissive material that allows the photoirradiation from the one or more sources of actinic radiation to penetrate the resin. In some embodiments, a 3D printer includes a digital light projection printer, a stereolithography printer, or the like that manufactures an object in successive two-dimensional (2D) layers. In some embodiments, the object is translated between a plurality of illumination steps.

In some embodiments, the 3D printer system includes a holographic printer, a tomographic printer, or a volumetric printer, which ensures a threshold criterion of a cumulative photodosage in each voxel of the resin is satisfied. In some such embodiments, the one or more sources of actinic radiation of the 3D printer system includes at least two sources of actinic radiation, which is characteristic of the holographic 3D printer. In some embodiments, the one or more sources of actinic radiation includes a first transport mechanism configured to provide translational and/or rotational movement for the one or more sources of actinic radiation, which is characteristic of the tomographic 3D printer. Moreover, in some embodiments, the resin enclosure includes a second transport mechanism that is configured to provide translational and/or rotational movement of the resin enclosure, and, therefore, the resin accommodated by the resin enclosure.

In some embodiments, the 3D printer system includes a temperature control system that is configured to maintain the resin enclosure at or below a temperature associated with the 3D printer system, such as a predetermined sub-ambient chilled state. In some embodiments, the temperature control system includes an interface (e.g., heat exchange mechanism) that is configured to conduct heat transfer between the temperature control system and the resin. In some embodiments, the temperature control system includes one or more thermoelectric coolers. In some embodiments, the enclosure of flowable resin is placed inside an outer glass container that is configured to accommodate a media. In some such embodiments, the media surrounds, or suspends, the resin. In some embodiments, the media does not disrupt a transmission of light from the one or more sources of actinic radiation into the resin, either partially or completely. Said otherwise, in some embodiments, a first index of refraction of the media is equal to, or substantially equal to, a second index of refraction of the resin. In some embodiments, the media is depressurized to permit evaporative cooling below a boiling temperature of the media. In some embodiments, the media is air, a vacuum, or a fluid having a respective index of refraction that is the same, or substantially the same, as a corresponding index of refraction of the resin enclosure.

In some embodiments, the 3D printer system is accommodated by (e.g., placed in) a vacuum enclosure or dry box that is configured to provide an atmosphere for the 3D printer system that minimizes heat transfer to the environment. In some embodiments, the temperature control system of the 3D printer system includes a source of heat (e.g., resistive heater, a matching heated coolant circuit, etc.) to provide fine control of the temperature of the 3D printer system. In some embodiments, the temperature control system is configured to sense the temperature of the 3D printer system, regulation the temperature of the 3D printer system, control the temperature of the 3D printer system, or a combination thereof. In some embodiments, the temperature of the 3D printer is sensed and/or regulated by one or more direct contact thermocouples, non-invasive infrared thermography, or related techniques. In some embodiments, a coolant of the temperature control system includes water, one or more brine solutions, polyethylene glycol, dry ice, dry ice and one or more solvent combinations, liquid nitrogen, liquid helium, and the like. In some embodiments, a temperature control system includes a control circuit that is includes one or more non-transitory logics that create a feedback loop to equilibrate the temperature of the 3D printer system when manufacturing an object at the 3D printer system. In some embodiments, a photoexposure dosage required for crosslinking of the resin changes with the temperature of the 3D printer system, such that the temperature of the 3D printer system sensed by the temperature control system alters a local photodosage to accommodate for a variety of variations.

Another aspect of the present disclosure is directed to providing a 3D printer system. The 3D printer system includes one or more sources of actinic radiation. The one or more sources of actinic radiation is characterized at least by a powered state in which the one or more sources of actinic radiation emit light and an unpowered state in which the one or more sources of actinic radiation are powered off. Furthermore, the 3D printer system includes a resin enclosure. The resin enclosure is transmissive to the one or more sources of actinic radiation. Moreover, the 3D printer system includes a temperature control system in thermal communication with the resin enclosure and configured to maintain the resin enclosure at or below a predetermined sub-ambient chilled state. Additionally, the 3D printer system includes a control circuit in electrical communication with the one or more sources of actinic radiation and the temperature control system. The control circuit includes first non-transitory logic to switch the one or more sources of actinic radiation to the powered state when one or more threshold criteria is satisfied. At least one threshold criteria in the one or more threshold criteria is a requirement that the temperature control system is in a predetermined state that causes the resin enclosure to be below a temperature associated with the 3D printer system. A second non-transitory logic to switch the one or more sources of actinic radiation to the unpowered state when one or more threshold criteria is not satisfied.

In some embodiments, the one or more sources of actinic radiation emit light within a wavelength range of 300 nanometers (nm) to 500 nm onto the resin enclosure when the one or more sources of actinic radiation is in the powered state.

In some embodiments, the temperature control system includes a thermoelectric cooler or a cryogenic cooler. In some embodiments, a coolant the cryogenic cooler includes water, one or more brine solutions, polyethylene glycol, dry ice, dry ice and one or more solvent combinations, liquid nitrogen, liquid helium, and the like.

In some embodiments, the at least one threshold criteria is a requirement that the temperature control system is in a predetermined state that causes the resin enclosure to be below about 4° C. In some embodiments, the at least one threshold criteria is a requirement that the temperature control system is in a predetermined state that causes the resin enclosure to be below about −4° C. In some embodiments, the at least one threshold criteria is a requirement that the temperature control system is in a predetermined state that causes the resin enclosure to be below about −100° C. In some embodiments, the at least one threshold criteria is a requirement that the temperature control system is in a predetermined state that causes the resin enclosure to be below about −150° C. In some embodiments, the at least one threshold criteria is a requirement that the temperature control system is in a predetermined state that causes the resin enclosure to be below about −196° C. In some embodiments, the at least one threshold criteria is a requirement that the temperature control system is in a predetermined state that causes the resin enclosure to be below about −269° C.

In some embodiments, the temperature control system regulates a temperature of the resin enclosure in an operating range having a lower limit and an upper limit. In some embodiments, the lower limit is about 4° C., about −4° C., about −100° C., about −150° C., about −196° C., or about −296° C. In some such embodiments, the upper limit is about room temperature, about 100° C., about 120° C., or about 200° C.

In some embodiments, the 3D printer is a holographic, tomographic, volumetric, or xolographic 3D printer.

In some embodiments, the 3D printer system further includes a rotary base plate. The resin enclosure is on the rotary base plate. Moreover, the temperature control system is in thermal communication with the resin enclosure through the rotary base plate.

In some embodiments, the control circuit further includes third non-transitory logic that causes the rotary base and the resin enclosure to spin.

In some embodiments, the resin enclosure is radially symmetric about a longitudinal axis, and the rotary base plate spins, which causes the resin enclosure to radially spin about the longitudinal axis.

In some embodiments, the 3D printer system further includes an outer glass container that has an interior. Moreover, the interior of the outer glass container is configured to accommodate the resin enclosure, such that the resin enclosure is in the interior of the outer glass container. In this way, a space not occupied by the resin enclosure is filled with a media that has an index of refraction that matches or approximately matches glass. Additionally, the outer glass container rests on the rotary base plate.

In some embodiments, the 3D printer system further includes a vacuum enclosure that houses the resin enclosure, the outer glass container, and the rotary base plate. The vacuum enclosure includes a lens in an optical path between a first source of actinic radiation and the resin enclosure. The first source of actinic radiation emits light onto the resin enclosure through the lens, the outer glass container, and the media when the first source of actinic radiation is in the powered state.

In some embodiments, the control circuit further includes a third non-transitory logic that causes the rotary base and the resin enclosure to spin. Moreover, the resin disclosure is symmetrical about a longitudinal axis. Accordingly, the rotary base plate spins, which causes the resin enclosure to spin about the longitudinal axis. Furthermore, the optical path between the first source of actinic radiation and the resin enclosure causes light to enter the resin enclosure radially.

In some embodiments, the 3D printer system further includes a vacuum enclosure or dry box that houses the one or more sources of actinic radiation, the resin enclosure, the outer glass container, and the rotary base plate. The one or more sources of actinic radiation emit light onto the resin enclosure through the outer glass container and the media when the one or more sources of actinic radiation is in the powered state.

In some embodiments, the 3D printer system further includes one or more processors, memory, and one or more programs stored in the memory for execution by the one or more processors. The one or more programs include instructions for receiving user confirmation that a polymerizable resin material has been loaded into the resin enclosure. The polymerizable resin material includes a solvent. Furthermore, the one or more programs include instructions for instructing the control circuit to maintain an amount of resin material in the resin enclosure at a first temperature that is below a melting temperature of the solvent using the temperature control system. Additionally, the one or more programs include instructions for instructing the control circuit to power the one or more sources of actinic radiation, which polymerizes a portion of the polymerizable resin material into a predetermined preliminary object shape. Moreover, this instructing the control circuit includes instructing the control circuit to supercritically evaporate or sublime the solvent out of the preliminary object shape, which forms a predetermined 3D object.

In some embodiments, the first temperature causes an amount of resin that has not polymerized at an apparent viscosity of at least $1*10^2$ Pa·s at 1 Hz, at least $1*10^3$ Pa·s 1 Hz, at least $1*10^4$ Pas 1 Hz, at least $1*10^5$ Pa·s 1 Hz, or at least $1*10^6$ Pa·s 1 Hz.

In some embodiments, a first source of actinic radiation in the one or more sources of actinic radiation is an LED light source.

In some embodiments, a first source of actinic radiation in the one or more sources of actinic radiation is a laser.

In some embodiments, the one or more sources of actinic radiation is a single source of actinic radiation. Moreover, the resin enclosure is radially symmetric. Furthermore, an optical path between the single source of actinic radiation to enter the resin enclosure radially when the single source of actinic radiation is in the powered state.

In some embodiments, the one or more sources of actinic radiation is a plurality of sources of actinic radiation. Moreover, the resin enclosure is in the form of a box including a first face and a second face orthogonal to the first face. Furthermore, a first source of actinic radiation in the plurality of sources of actinic radiation causes light to enter the resin enclosure by a first optical path through the first face when in the powered state. Additionally, a second source of actinic radiation in the plurality of sources of actinic radiation causes light to enter the resin enclosure by a second optical path through the second face when in the powered state.

In some embodiments, the control circuit further includes a fourth non-transitory logic that causes the control circuit to apply an electric or magnetic field to the media.

In some embodiments, the control circuit further includes a fifth non-transitory logic configured to switch the one or more sources of actinic radiation to the powered state when one or more threshold criteria is satisfied. The at least one threshold criteria in the one or more threshold criteria is a requirement that the temperature control system is in a predetermined state that causes the media to be at a temperature associated with the three-dimensional printer system.

In some embodiments, the outer glass container is made of glass, quartz, fused silica, borosilicate glass, silica-boron trioxide glass, or sapphire.

In some embodiments the media includes deionized water, glycerol, silicone oil, benzyl benzoate, chlorobenzene, or a combination thereof.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

Figure 1:
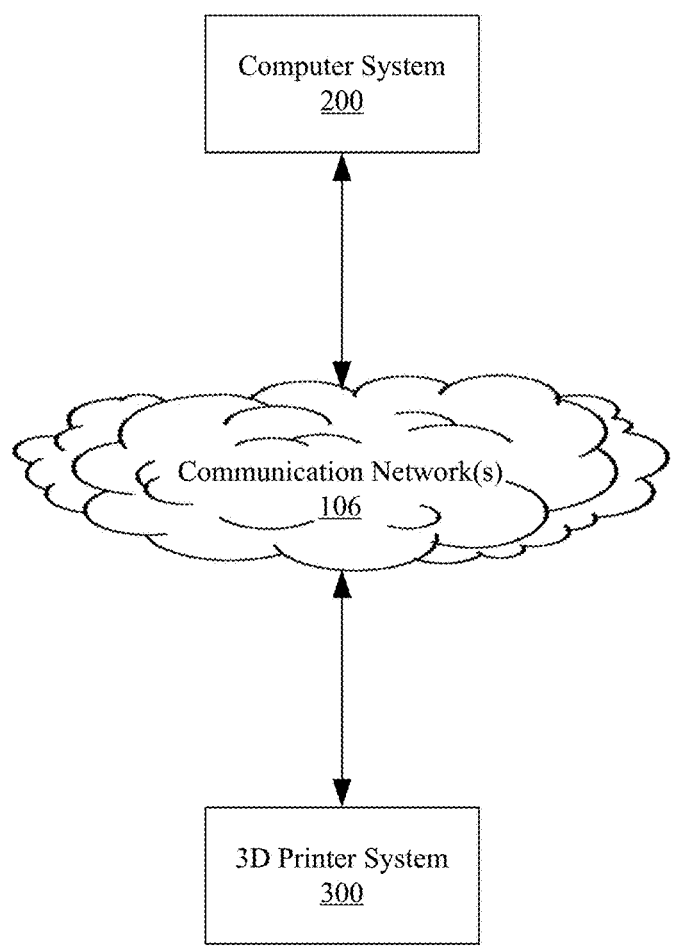
FIG. 1 illustrates an exemplary distributed additive manufacture system topology including a computer system and a 3D printer system, in accordance with an embodiment of the present disclosure.

Volumetric printing (e.g., holographic or tomographic projection into a resin enclosure including a photopolymer resin) enables rapid fabrication of polymeric 3D objects from a single photoexposure. Unlike conventional methods for vat polymerization (stereolithography, digital light processing, continuous liquid interface printing, etc.), the systems, methods, and devices of the present disclosure are compatible with high viscosity photopolymer resins used to manufacture an object. According to the present disclosure, photopolymer resins are used that have a relatively high apparent viscosity (e.g., apparent viscosity of a solid at 1 Hz) during a manufacturing process at a 3D printer system. These resins include, without limitation, materials with a melting temperature above room temperature. In alternative embodiments, these resins include materials that are cooled below the melting temperature or below the glass transition temperature, which is below room temperature, prior to manufacture of the object from the resin.

One skilled in the art of the present disclosure will appreciate that VAM techniques uses a single photoirradiation step (e.g., tomography or holography) to provide a volume of pre-polymer resin with sufficient photodose by way of one or sources of actinic radiation. The one or more sources of actinic radiation is used to selectively crosslink individual voxels of the resin. As used herein, the voxel is the volumetric equivalent to a planar pixel. This is a technology related to conventional 3D printing techniques of digital light printing, stereolithography, etc.

In some embodiments, the present disclosure provides systems, methods, and devices for processing an ultrahigh viscosity resin. In some such embodiments, manufacturing an object at a 3D printer system with an ultrahigh viscosity resin includes a single build step, which obviates prior issues with resin replenishment and avoids viscous adhesion complications.

In some embodiments, the systems, methods, and devices of the present disclosure provide a 3D printer platform computer system, which allows for a wide range of processible polymeric resins to manufacture from at a 3D printer system.

The systems, methods, and devices of the present disclosure cover broadly a resin of the 3D printer system that includes a material formulations including at least a photoinitiator and one or more photopolymerizable and/or photo-crosslinkable species (e.g., acrylate, methacrylate, thiol-ene, thiol-acrylate, etc.). In some embodiments, the resin of the present disclosure includes one or more non-photo-reactive diluents, such as one or more solvents, one or more monomers, one or more oligomers, and one or more polymers. In some embodiments, these materials are combined, hereinafter referred to as the "resin," such as at an elevated temperature or an ambient temperature if a precursor of the resin 325 satisfies a threshold miscibility and is flowable at the elevated temperature or the ambient temperature, and then cooled or quenched below their freezing point. In some such embodiments, this heating and quenching is beneficial for crystalline resin 325 that has a solubility gap at the ambient temperature. In some embodiments, these materials are then cooled to a temperature (e.g., as determined by a respective material property of the resin) apparent viscosities exceeds about 100 Pa·s at 1 Hz at the time of manufacturing an object at a 3D printer system of the present disclosure. The resin is then subjected to tomographic or holographic exposure consistent with VAM technique to induce localized photopolymerization. In some embodiments, upon polymerization, the resin is subjected to additional post processing. For instance, in the case of foamed materials, the porogen is first removed from the resin via super critical drying (e.g., solvent displacement if necessary) or sublimation (e.g., freeze-drying). Accordingly, the part is heated above the melting temperature, the now flowable uncrosslinked resin is removed and the photopatterned part remains. Moreover, these processes are facilitated by having the 3D printer system with the temperature control system, which allows for the regulation of the temperature of the resin.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the embodiments.

Plural instances may be provided for components, operations or structures described herein as a single instance. Finally, boundaries between various components, operations, and data stores are somewhat arbitrary, and particular operations are illustrated in the context of specific illustrative configurations. Other forms of functionality are envisioned and may fall within the scope of the implementation (s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first source of actinic radiation could be termed a second source of actinic radiation, and, similarly, a second source of actinic radiation could be termed a first source of actinic radiation, without departing from the scope of the present disclosure. The first source of actinic radiation and the second source of actinic radiation are both sources of actinic radiation, but they are not the same source of actinic radiation.

The terminology used herein is for the purpose of describing particular implementations only and is not intended to be limiting of the claims. As used in the description of the implementations and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description included example systems, methods, techniques, instruction sequences, and computing machine program products that embody illustrative implementations. For purposes of explanation, numerous specific details are set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations.

However, the illustrative discussions below are not intended to be exhaustive or to limit the implementations to the precise forms disclosed. Many modifications and variations are possible in view of the above teachings. The implementations are chosen and described in order to best explain the principles and their practical applications, to thereby enable others skilled in the art to best utilize the implementations and various implementations with various modifications as are suited to the particular use contemplated.

In the interest of clarity, not all of the routine features of the implementations described herein are shown and described. It will be appreciated that, in the development of any such actual implementation, numerous implementation-specific decisions are made in order to achieve the designer's specific goals, such as compliance with use case constraints, and that these specific goals will vary from one implementation to another and from one designer to another. Moreover, it will be appreciated that such a design effort might be complex and time-consuming, but nevertheless be a routine undertaking of engineering for those of ordering skill in the art having the benefit of the present disclosure.

For convenience in explanation and accurate definition in the appended claims, the terms "upper," "lower," "up," "down," "upwards," "downwards," "laterally," "longitudinally," "inner," "outer," "inside," "outside," "inwardly," "outwardly," "interior," "exterior," "front," "rear," "back," "forwards," and "backwards" are used to describe features of the exemplary embodiments with reference to the positions of such features as displayed in the figures.

Furthermore, when a reference number is given an "$i^{th}$" denotation, the reference number refers to a generic component, set, or embodiment. For instance, a source of actinic radiation "source of actinic radiation i" refers to the $i^{th}$ source of actinic radiation scene in a plurality of source of actinic radiation (e.g., a source of actinic radiation 40-i in a plurality of source of actinic radiation 40).

The term "lens," as used herein, includes a single lens or an assembly of lenses, unless expressly stated otherwise.

Further, the term "target," as used herein, means a feature pulsed by a beam of a light source a number of times. A respective target can be subject to a single pulse or a plurality of pulses.

As used herein, the term "about" or "approximately" can mean within an acceptable error range for the particular value as determined by one of ordinary skill in the art, which can depend in part on how the value is measured or determined, e.g., the limitations of the measurement system. For example, "about" can mean within 1 or more than 1 standard deviation, per the practice in the art. "About" can mean a range of +20%, +10%, +5%, or #1% of a given value. Where particular values are described in the application and claims, unless otherwise stated, the term "about" means within an acceptable error range for the particular value. The term "about" can have the meaning as commonly understood by one of ordinary skill in the art. The term "about" can refer to +10%. The term "about" can refer to +5%.

In the present disclosure, unless expressly stated otherwise, descriptions of devices and systems will include implementations of one or more computers. For instance, and for purposes of illustration in FIG. 1, a computer system 200 is represented as single device that includes all the functionality of the computer system 200. However, the present disclosure is not limited thereto. For instance, the functionality of the computer system 200 may be spread across any number of networked computers and/or reside on each of several networked computers and/or by hosted on one or more virtual machines and/or containers at a remote location accessible across a communications network (e.g., communication networks 106). One skilled in the art of the present disclosure will appreciate that a wide array of different computer topologies is possible for the computer system 200, and other devices and systems of the preset disclosure, and that all such topologies are within the scope of the present disclosure.

In general, the present disclosure provides systems, methods, and devices for the additive manufacture of an object at a 3D printer system using temperature control, preferably sub-ambient temperature control.

Referring to FIGS. 1, 2, 3, 4, 5, and 6, a system for additive manufacturing is provided. More specifically, FIG. 1 depicts a block diagram of a distributed additive manufacture system (e.g., distributed additive manufacture system 100) according to some embodiments of the present disclosure. The system 100 facilitates the manufacture of an object (e.g., object 750 of FIG. 7) at a 3D printer system (e.g., 3D printer system 300 of FIG. 6).

Of course, other topologies of the system 100 are possible. For instance, in some embodiments, any of the illustrated devices and systems can in fact constitute several computer systems that are linked together in a network or be a virtual machine and/or container in a cloud-computing environment. Moreover, rather than relying on a physical communication network 106, the illustrated devices and systems may wirelessly transmit information between each other. As such, the exemplary topology shown in FIG. 1 merely serves to describe the features of an embodiment of the present disclosure in a manner that will be readily understood to one skilled in the art.

Referring to FIG. 1, in some embodiments, a distributed client-server system 100 includes a computer system 200 that facilitates providing one or more instructions for controlling a 3D printer system 300. In some embodiments, the computer system 200 and 3D printer system 300 are in a single monolithic casing without a communication network 106. In other embodiments, the computer system 200 and 3D printer system 300 are separated by some distance and are in electrical communication with each other over the communication network as illustrated in FIG. 1.

In some embodiments, the communication networks 106 optionally includes the Internet, one or more local area networks (LANs), one or more wide area networks (WANs), other types of networks, or a combination of such networks.

Examples of communication networks 106 include the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Now that a distributed additive manufacture system 100 has generally been described, an exemplary computer system 200 for providing one or more instructions, such as one or more non-transitory logics, for controlling a 3D printer system 300 will be described with reference to FIG. 2.

In various embodiments, the computer system 200 includes one or more processing units (CPUs) 274, a network or other communications interface 284, and memory 292.

Memory 292 includes high-speed random access memory, such as DRAM, SRAM, DDR RAM, or other random access solid state memory devices, and optionally also includes non-volatile memory, such as one or more magnetic disk storage devices, optical disk storage devices, flash memory devices, or other non-volatile solid state storage devices. Memory 292 may optionally include one or more storage devices remotely located from the CPU(s) 274. Memory 292, or alternatively the non-volatile memory device(s) within memory 292, includes a non-transitory computer readable storage medium. Access to memory 292 by other components of the computer system 200, such as the CPU(s) 274, is, optionally, controlled by a controller. In some embodiments, memory 292 can include mass storage that is remotely located with respect to the CPU(s) 274. In other words, some data stored in memory 292 may in fact be hosted on devices that are external to the computer system 200, but that can be electronically accessed by the computer system 200 over an Internet, intranet, or other form of network 106 or electronic cable using communication interface 284.

In some embodiments, the memory 292 of the computer system 200 for controlling a 3D printer system 300 to manufacture an object 750 stores:

- an optional operating system 202 (e.g., ANDROID, IOS, DARWIN, RTXC, LINUX, UNIX, OS X, WINDOWS, or an embedded operating system such as VxWorks) that includes procedures for handling various basic system services;
- an electronic address 204 associated with the computer system 200 that identifies the computer system 200;
- a material library 206 that stores a plurality of material properties 208 associated with a corresponding material that is utilized by the 3D printer system 300;
- an object library 210 that stores a plurality of object properties 212 for manufacturing a corresponding object (e.g., object 750 of FIG. 7) at the 3D printer system 300; and
- a printer control module 214 that stores one or more non-transitory logics 216 that instruct a control of a manufacture the corresponding object 750 at the 3D printer system 300.

An electronic address 204 is associated with the computer system 200. The electronic address 204 is utilized to identify the computer system 200 at least uniquely from other devices and components of the distributed additive manufacture system 100 (e.g., uniquely identify computer system 200 from the 3D printer system 300 of FIG. 3).

In some embodiments, a material library 206 is configured to store at least a plurality of materials properties 208 that is associated with a corresponding material (e.g., first plurality of material properties 208-1 is associated with a corresponding first material, second plurality of material properties 208-2 is associated with a corresponding second material, etc.). Each corresponding material associated with a respective plurality of material properties 208 is found at or produced by the 3D printer system 300. For instance, in some embodiments, the corresponding material associated with the plurality of materials properties 208 is the resin 325 accommodated by the resin enclosure 320 of the 3D printer system 300. In some embodiments, the corresponding material associated with the plurality of materials properties 208 is a media 375 of the 3D printer system 300. Moreover, in some embodiments, the corresponding material associated with the plurality of materials properties 208 is a material of the resin enclosure 320 or a different component of the 3D printer system (e.g., outer glass container 350 of FIG. 6, temperature control system 330 of FIG. 5, etc.). For instance, in some such embodiments, the corresponding material associated with the plurality of material properties 208 is a coolant of the thermal control system 300.

In some embodiments, a respective material property in the plurality of material properties 208 is associated with a physical property of the corresponding material. As a non-limiting example, in some such embodiments, the physical property of the corresponding material associated with the respective material property is a first model of a phase diagram of the corresponding material that includes an evaluation of a boiling point of the corresponding material, an evaluation of a melting point of the corresponding material, an evaluation of a critical point of the corresponding material, an evaluation of a supercritical fluidic phase region of the corresponding material, an evaluation of a glass transition temperature, or a combination thereof. As another non-limiting example, in some embodiments, the physical property of the corresponding material associated with the respective material property is a second model of a viscosity of the corresponding material, a third model of an index of refraction of the corresponding material, a fourth model of an evaluation of a depth of curing of the corresponding material volumetric shrinkage of the corresponding material, a fifth model of a flexural strength of the corresponding material, or a combination thereof. For instance, in some embodiments, the evaluation of the depth of curing is dependent on a molar absorptivity of at least the resin 325, a photoinitiator concentration of the resin 325, a scattering of the resin 325, a temperature ramp of the resin 325 that is configured to specify a rate of change in the temperature of the resin over a period of time, a crystallinity of the resin 325, a light absorber of the resin 325, or a combination thereof. In some embodiments, the physical property of the corresponding material is a thermal property, such as a sixth model of a thermal conductivity of the corresponding material, a seventh model of a thermal diffusivity of the corresponding material, an eight model of a specific heat capacity, a ninth model of a thermal effusivity of the corresponding model, a tenth model of a material density of the corresponding material, or a combination thereof. Additional details and information regarding one or more models for an evaluation of a physical property of the corresponding material can be found at Tsujimoto et al., 2017, "Depth of Cure, Flexural Properties and Volumetric Shrinkage of Low and High Viscosity Bulk-fill Giomers and Resin Composites," Dental Materials Journal, pg. 2016; Ueki et al., 2005, "Designing of Epoxy Resin Systems for Cryogenic Use," Cryogenics, 45 (2), pg. 141; Palin et al., 2018, "Shining a Light on High Volume Photocurable Materials," Dental Materials, 34 (5), pg. 695, each of which is hereby incorporated by reference in its entirety. However, the present disclosure is not limited thereto. From the plurality of material properties 208 associated with the physical property of the corresponding material (e.g., the resin 325 and/or the media 375), a manufacture of an object 750 is dynamically modified based on one or more material properties in the plurality of materials properties 208, such as by changing a temperature of the resin 325 and/or the media 375 to change a corresponding index of refraction of the resin 325 and/or the media 375.

For instance, in some embodiments, the respective material property in the plurality of material properties 208 is associated with a supply of the corresponding material at a 3D printer system 300, such as an amount (e.g., a weight, a volume, etc.) of a reservoir of the corresponding material at the 3D printer system 300. One skilled in the art of the present disclosure will appreciate that a wide domain of material properties 208 are applicable to the systems, methods, and devices of the present disclosure.

In some embodiments, the object library 210 is configured to store at least a plurality of object properties 212 that is associated with a corresponding object 750 (e.g., first plurality of object properties 212-1 is associated with a corresponding first object 750-1, second plurality of material properties 212-2 is associated with a corresponding second object 750-2, etc.). In some embodiments, a respective object property 212 in the plurality of object properties 212 includes a set of non-transitory instructions for manufacturing the corresponding object 750 by way of one or more additive manufacturing techniques. For instance, in some embodiments, a first object property in a first plurality of object properties 212-1 includes a first set of non-transitory instructions for manufacturing a corresponding second object 750-2 at a holographic 3D printer system 300, a second object property in the first plurality of object properties 212-1 includes a second set of non-transitory instructions for manufacturing a corresponding second object 750-2 at a xolographic 3D printer system 300, and the like. Generally, for such VAM techniques, a control of a composition of a plurality of voxels is provided by the plurality of object properties 212, which allows for optimization of one or more quality properties of the corresponding object 750, such as a color of the corresponding object 750 or a mechanical property of the corresponding object 750. In some embodiments, this control of the composition of the plurality of voxels is performed by manipulating the light emitted by the one or more sources of actinic radiation 310. Additional details and information regarding controlling the plurality of object properties for manufacture of the corresponding object at the 3D printer system 300 can be found at Morovič et al., 2019, "Co-optimization of Color and Mechanical Properties by Volumetric Voxel Control," Structural and Multidisciplinary Optimization, 60 (3), pg. 895.

Figure 2:
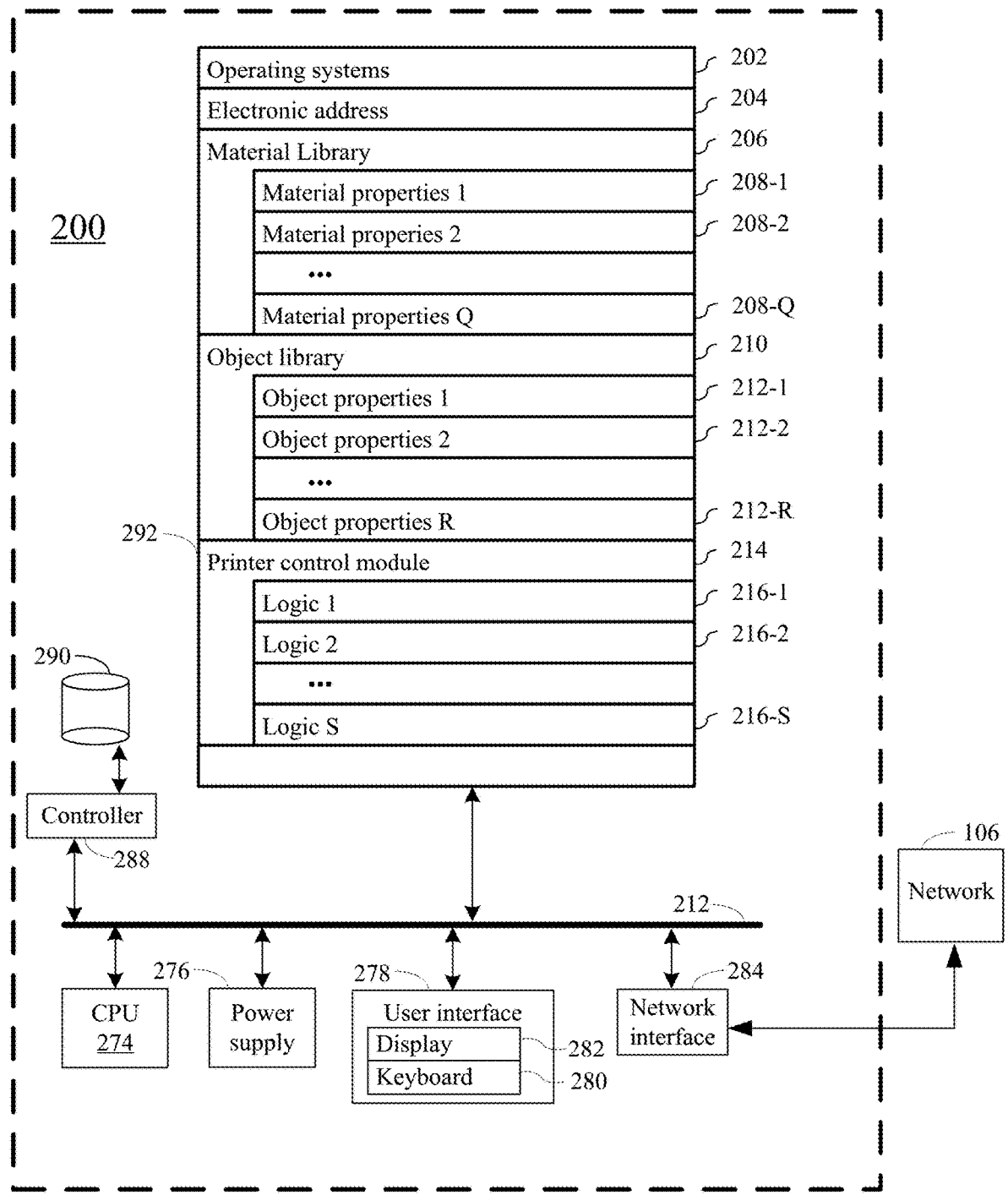
FIG. 2 illustrates various modules and/or components of a computer system, in accordance with an exemplary embodiment of the present disclosure.

In some embodiments, the printer control module 214 stores one or more non-transitory logics 216 (e.g., first non-transitory logic 216-1, second non-transitory logic 216-2, . . . , non-transitory logic S 216-S of FIG. 2). Each of the non-transitory logics 216 is configured to control an aspect of a 3D printer system 300 by one or more instructions for the 3D printer system 300. For instance, in some embodiments, a respective non-transitory logics 216 includes one or more instructions to modify an intensity of light emitted by the one or more sources of actinic radiation 310, an exposure time of light emitted by the one or more sources of actinic radiation 310, a supply of a pre-polymer solution of the resin 325, a supply of a photoinitiator accommodated of the resin 325, and the like. As another non-limiting example, in some embodiments, a respective non-transitory logic 216 is configured to switch a power state of the 3D printer system 200, such as a respective powered state (e.g., switch to/from a powered state, an unpowered stated, etc.) of the one or more sources of actinic radiation 310, a respective powered state of a temperature control system 330 of the 3D printer system 300, a respective powered state of a control circuit 335 of the 3D printer system, a respective powered state of a rotary base plate 340 of the 3D printer system 300, or a combination thereof. Said otherwise, in some embodiments, one or more features of the 3D printer system 300, such as the one or more sources of actinic radiation 310 or the temperature control system 330, is characterized at least by a powered state. In some embodiments, in the powered state, the one or more features of the 3D printer system 300 is active, such as when the one or more sources of actinic radiation 310 emit light. Conversely, in an unpowered state the one or more sources of actinic radiation 310 is powered off, which interrupts the emitting of light and, therefore, manufacture of an object 750 at the 3D printer system 300.

In some embodiments, the powered state switched by the non-transitory logic 216 is configured to emit light from the one or more sources of actinic radiation 310 in a grayscale pattern, hereinafter a "grayscale powered state." In the grayscale powered state, independent control of intensity and/or spatial properties of an optical path 315 is varied to form controlled concentrations of light emitted from the one or more sources of actinic radiation, as opposed to a binary powered control that lacks this local concentration control. In some embodiments, the grayscale powered state locally varies the exposure time of a surface (e.g., voxel of the resin 325) to a uniform stimulus, such as by slowly (e.g., over a period of time in a range of from 0.1 seconds to 10 seconds, from 5 seconds to 60 seconds, from 30 seconds to 600 seconds, from 1 minute to 30 minutes, from 15 minutes to 120 minutes, from 1 hour to 6 hours, or a combination thereof) exposing the resin 325 substrate to a patterned exposure of the one or more sources of actinic radiation 310. For instance, in some embodiments, the exposing the resin 325 includes emitting light from the one or more sources of actinic radiation 310 for a predetermined intensity and/or a predetermined exposure, such as a 10 second exposure at a 15 milliwatts per square centimeter (mW $cm^2$) intensity when the light emitted from the one or more sources of actinic radiation 310 is 405 nm. However, the present disclosure is not limited thereto. For instance, the exposure and/or intensity of the light emitted by the one or more sources of actinic radiation 310 is determined based on a threshold photodose the one or more sources of actinic radiation 310 must collectively provide in order to manufacture the object 750 at the 3D printer system 300. In some embodiments, the grayscale powered state locally varies an exposure dose of the surface, such as partially shading the surface exposed the one or more sources of actinic radiation 310 or by utilizing a temperature gradient by way of the temperature control system 300 of the 3D printer system to selectively activate the resin 325. In some embodiments, the grayscale powered state uniformly exposes the surface to a pre-generated gradient of light emitted by the one or more sources of actinic radiation 310. Additional details and information regarding the use of grayscale powered states with non-transitory logic 216 can be found at Ge et al., 2020, "Grayscale Surface Patterning using Electrophoretic Motion through a Heterogeneous Hydrogel Material," Electrophoresis, 41 (13), pg. 1160; Valizadeh et al., 2021, "Tailoring of Functionally Graded Hyperelastic Materials via Grayscale Mask Stereolithography 3D Printing," Additive Manufacturing, pg. 102108, each of which is hereby incorporated by reference in its entirety.

In some embodiments, the object library 210 is subsumed by, or in communication with, the printer control module 214. For instance, in some embodiments, the non-transitory logic 216 of the printer control module 214 includes a geometric slicer for translating slicing a corresponding object 750 for manufacture at the 3D printer system 300. This geometric slicer includes generating, from a geometric representation that defines the corresponding object 750, the plurality of voxels that best approximates the corresponding object given the set of the plurality of object properties 212 together with the plurality of material properties 208 and a respective 3D printer system 300. In some embodiments, the generating the plurality of voxels includes determining a minimum thickness of the corresponding object 750 when manufactured at the respective 3D printer system 300, a maximum thickness of the corresponding object 750 when manufactured at the respective 3D printer system 300, a total thickness of the corresponding object 750 when manufactured at the respective 3D printer system 300, or a combination thereof. Additional details and information regarding the geometric slicer of the non-transitory logic 216 can be found at Patil et al., 2005, "Voxel-based Representation, Display and Thickness Analysis of Intricate Shapes," CAD-CG-05, pg. 6-pp, which is hereby incorporated by reference in its entirety.

Figure 7:
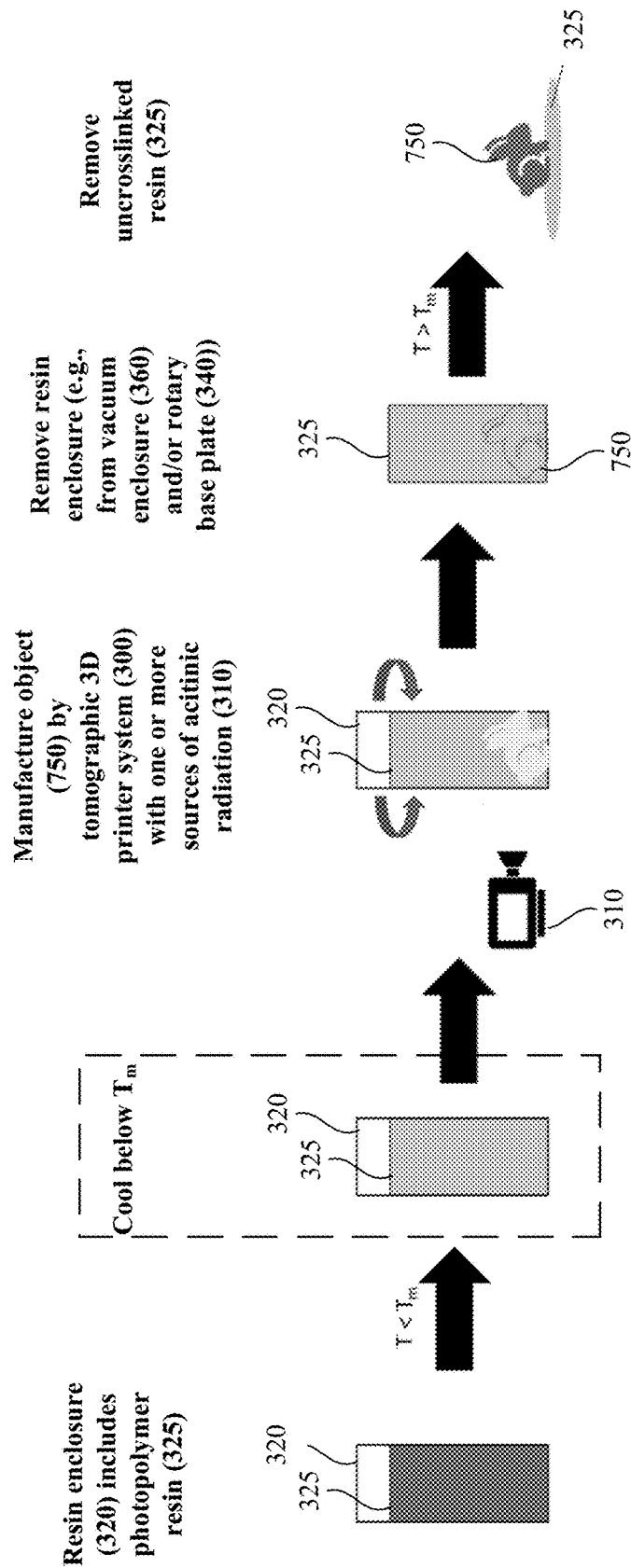
FIG. 7 is a flow chart illustrating exemplary methods for manufacturing an object using a 3D printer system, in accordance with an embodiment of the present disclosure, in which optional elements of embodiments are indicated by dashed boxes and/or lines.

Each of the above identified modules and applications correspond to a set of executable instructions for performing one or more functions described above and the methods described in the present disclosure (e.g., the computer-implemented methods and other information processing methods described herein; method 700 of FIG. 7; etc.). These modules (e.g., sets of instructions) need not be implemented as separate software programs, procedures or modules, and thus various subsets of these modules are, optionally, combined or otherwise re-arranged in various embodiments of the present disclosure. In some embodiments, the memory 292 optionally stores a subset of the modules and data structures identified above. Furthermore, in some embodiments, the memory 292 stores additional modules and data structures not described above.

It should be appreciated that the computer system 200 of FIG. 2 is only one example of a computer system 200, and that the computer system 200 optionally has more or fewer components than shown, optionally combines two or more components, or optionally has a different configuration or arrangement of the components. The various components shown in FIG. 2 are implemented in hardware, software, firmware, or a combination thereof, including one or more signal processing and/or application specific integrated circuits.

Referring to FIGS. 3, 4, 5, and 6, a 3D printer system (e.g., 3D printer system 300 of FIG. 3, 3D printer system 300 of FIG. 4, 3D printer system 300 of FIG. 5, 3D printer system 300 of FIG. 6, etc.) in accordance with some embodiments of the present disclosure is provided. The 3D printer system 300 includes one or more sources of actinic radiation 310 that emit light along an optical path towards a resin enclosure 320. Moreover, the 3D printer system includes a temperature control system 330 that interfaces, either directly or indirectly, with the resin enclosure 320 to transfer heat with the resin enclosure 320. From this structure, in some embodiments, the temperature control system 330 maintains a temperature of the resin 325 below a temperature associated with the 3D printer system 300 that allows for a solvent in a resin 325 of the 3D printer system 300 to supercritically evaporate or sublime out of the resin 325. Accordingly, an object 750 is formed at the 3D printer system 300 with improved mechanical properties, such as improved moduli, improved color, improved resolution, improved complexity, and the like.

More particularly, the one or more sources of actinic radiation 310 (e.g., first source of actinic radiation 310-1 of FIG. 3) of the 3D printer system 300 is configured to emit light towards a targeted direction, which is typically an axis of the resin enclosure 320. In some embodiments, each source of actinic radiation 310 in the one or more sources of actinic radiation 310 emits light from a predetermined band of light. For instance, in some such embodiments, the predetermined band of actinic radiation is a single wavelength of light that initiates a polymerization pattern in a plane of a resin (e.g., resin 325 of FIG. 7). Accordingly, the predetermined band of actinic radiation provides for uniform emission of light from the one or more sources of actinic radiation 310. However, the present disclosure is not limited thereto. For instance, in embodiments, the one or more sources of actinic radiation 310 include a first source of actinic radiation 310-1 that is characterized by a first wavelength of light (e.g., 470 nm) and a second source of actinic radiation 310-2 that is characterized by a second wavelength of light (e.g., 365 nm). In some embodiments, the first source of actinic radiation 310-1 is configured to activate polymerization of the resin 325 and the second source of actinic radiation 320-2 is configured to inhibit the polymerization of the resin. However, the present disclosure is not limited thereto. Additional details and information regarding polymerization activation and inhibition using the one or more sources of actinic radiation 310 can be found at De Beer et al., 2019, "Rapid, Continuous Additive Manufacturing by Volumetric Polymerization Inhibition Patterning," Science Advances, 5 (1), eaau8723, which is hereby incorporated by reference in its entirety.

As such, in some embodiments, a first source of actinic radiation 310-1 in the one or more sources of actinic radiation 310 is a laser, which provides a coherent optical path 315. In some embodiments, each source of actinic radiation 310 in the one or more sources of actinic radiation 310 is the laser. Alternatively, in some embodiments, the first source of actinic radiation 310-1 in the one or more sources of actinic radiation 310 is a light emitting diode (LED). Moreover, in some embodiments, each source of actinic radiation 310 in the one or more sources of actinic radiation 310 is the LED. Furthermore, in some embodiments, the first source of actinic radiation 310-1 in the one or more sources of actinic radiation 310 is a projector based light source.

Furthermore, in some embodiments, the one or more sources of actinic radiation 310 emit light within a wavelength range of about 300 nm to about 500 nm (e.g., 345 nm). For instance, in some embodiments, a wavelength range of the one or more sources of actinic radiation 310 is from about 300 nm to about 320 nm, from about 315 nm to about 335 nm, from about 330 nm to about 350 nm, from about 345 nm to about 365 nm, from about 360 nm to about 380, from about 375 nm to about 405 nm, from about 400 nm to about 420 nm, from about 415 nm to about 435 nm, from about 430 nm to about 450 nm, from about 445 nm to about 465 nm, from about 460 nm to about 480, or from about 475 to about 505 nm (e.g., 510 nm). In some embodiments, the wavelength range of the one or more sources of actinic radiation 310 is selected based on a corresponding selection of a material of the 3D printer system 300, such as a material (e.g., media 375 of FIG. 4) of the 3D printer system 300, the resin (e.g., resin 325 of FIG. 7) of the 3D printer system 300, the resin enclosure 320 of the 3D printer system 300, or a combination thereof. In this way, the resin enclosure 320 is exposed to the light emitted by the one or more sources of actinic radiation 310 when the one or more sources of actinic radiation 310 is in a powered state.

In some embodiments, the one or more sources of actinic radiation 310 contains one such source of actinic radiation 310, which allows for a highly predictable and uniform exposure of light on a surface or voxel of the resin 325. However, the present disclosure is not limited thereto. For instance, referring briefly to FIG. 5, in some embodiments, the one or more sources of actinic radiation 310 includes two or more such sources of actinic radiation 310. In some such embodiments, a number of sources of actinic radiation 310 in the two or more sources of actinic radiation 310 is based on a geometric characteristic of the 3D printer system 300, such as a number of surfaces or faces of the resin enclosure 320. For instance, in some embodiments, each source of actinic radiation 310 in the one or more sources of actinic radiation 310 emits a respective light beam along a corresponding optical path 315 that intercepts an axis of the resin enclosure 320, such as a longitudinal axis of the resin enclosure 320. In this way, in some such embodiments, a central angle formed by an arc length (e.g., arc length A of FIG. 5) is in a range of from about 10 degrees) (° to about 90° (e.g., 45)°. In some embodiments, each respective source of actinic radiation 310 in the one or more sources of actinic radiation 310 emits light along a unique, or substantially unique, optical path 315 (e.g., first source of actinic radiation 310-1 in the one or more sources of actinic radiation 310 emits light along first optical path 315-1 and second source of actinic radiation 310-2 in the one or more sources of actinic radiation 310 emits light along second optical path 315-2 of FIG. 5). Said otherwise, in such embodiments, the first source of actinic radiation 310-1 in the one or more sources of actinic radiation 310 cannot oppose, or substantially oppose, the second source of actinic radiation 310-2 in the one or more sources of actinic radiation 310.

Figure 3:
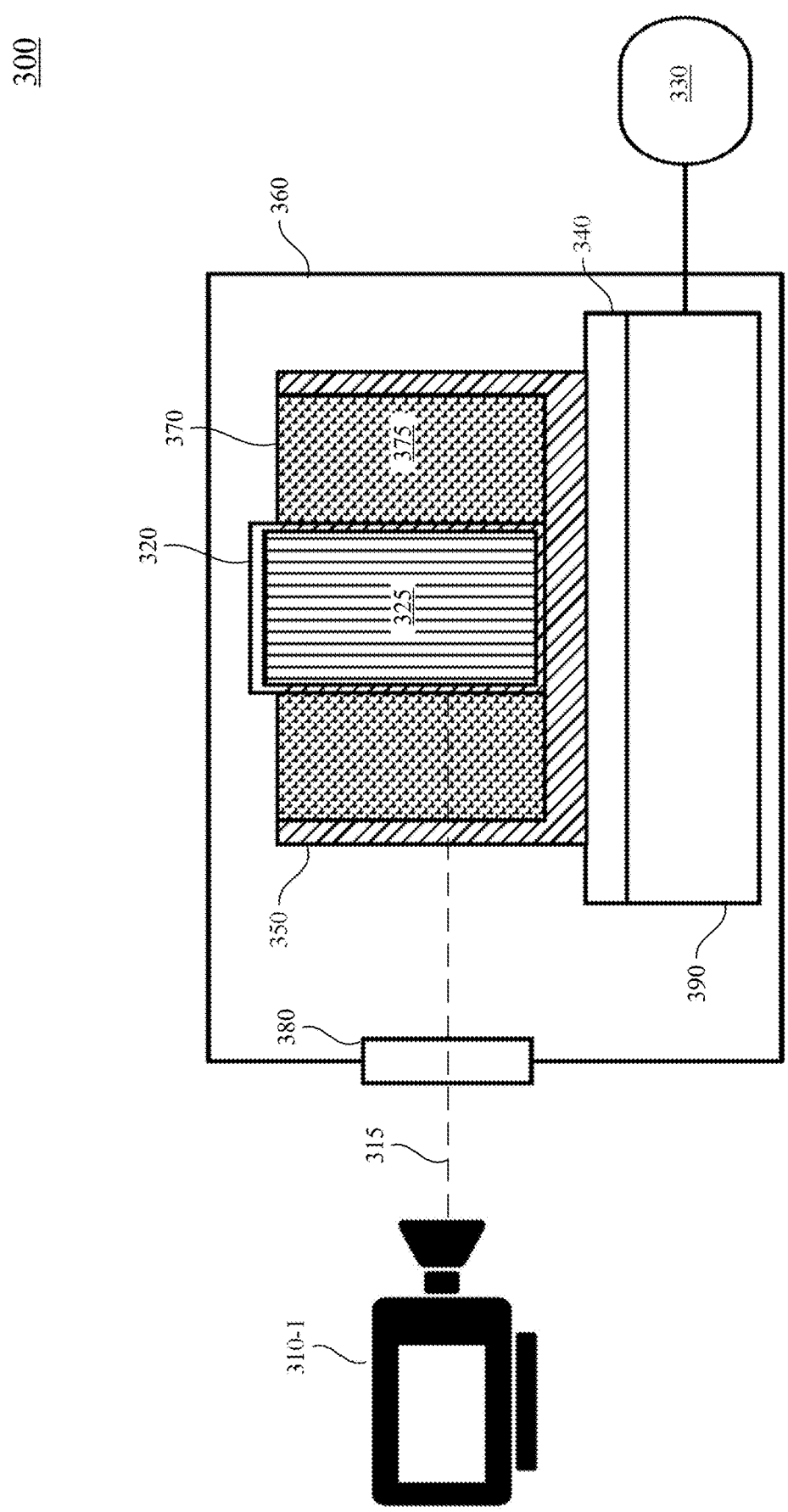
FIG. 3 illustrates a cross-sectional side view of a 3D printer system, in accordance with an embodiment of the present disclosure.
Figure 4:
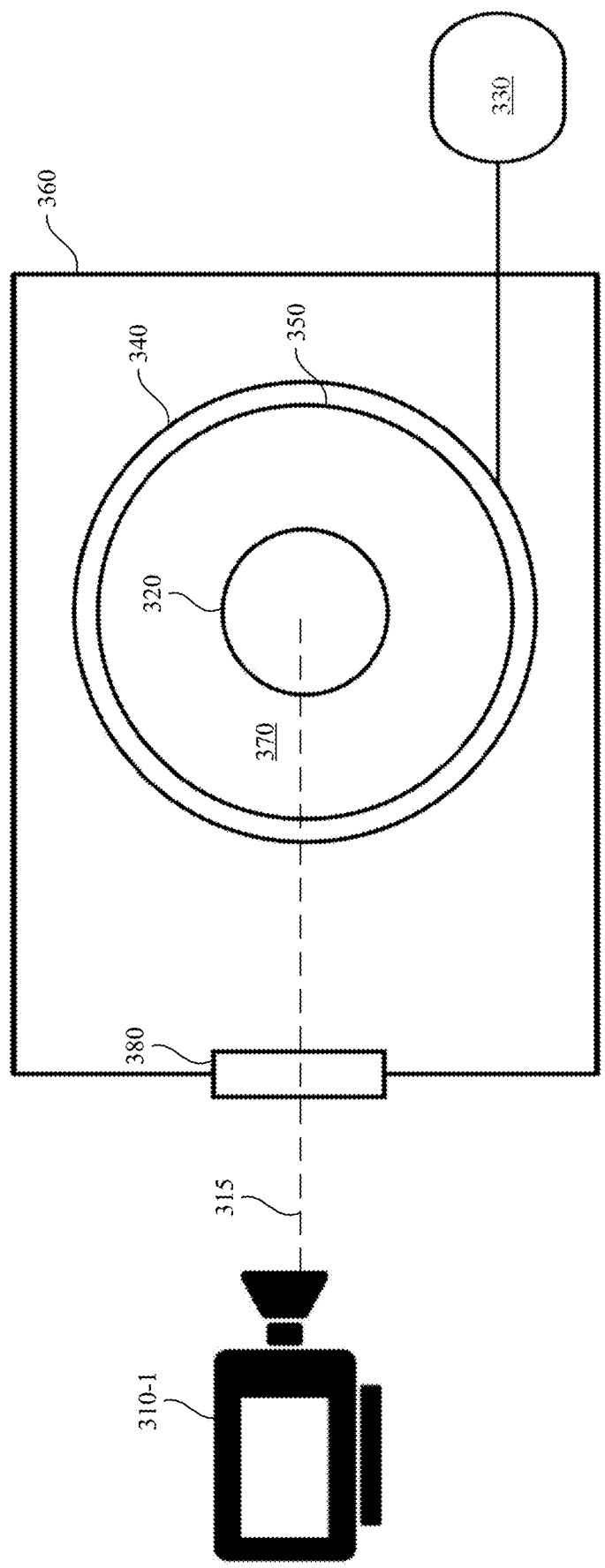
FIG. 4 illustrates a top view of the 3D printer system of FIG. 3.
Figure 5:
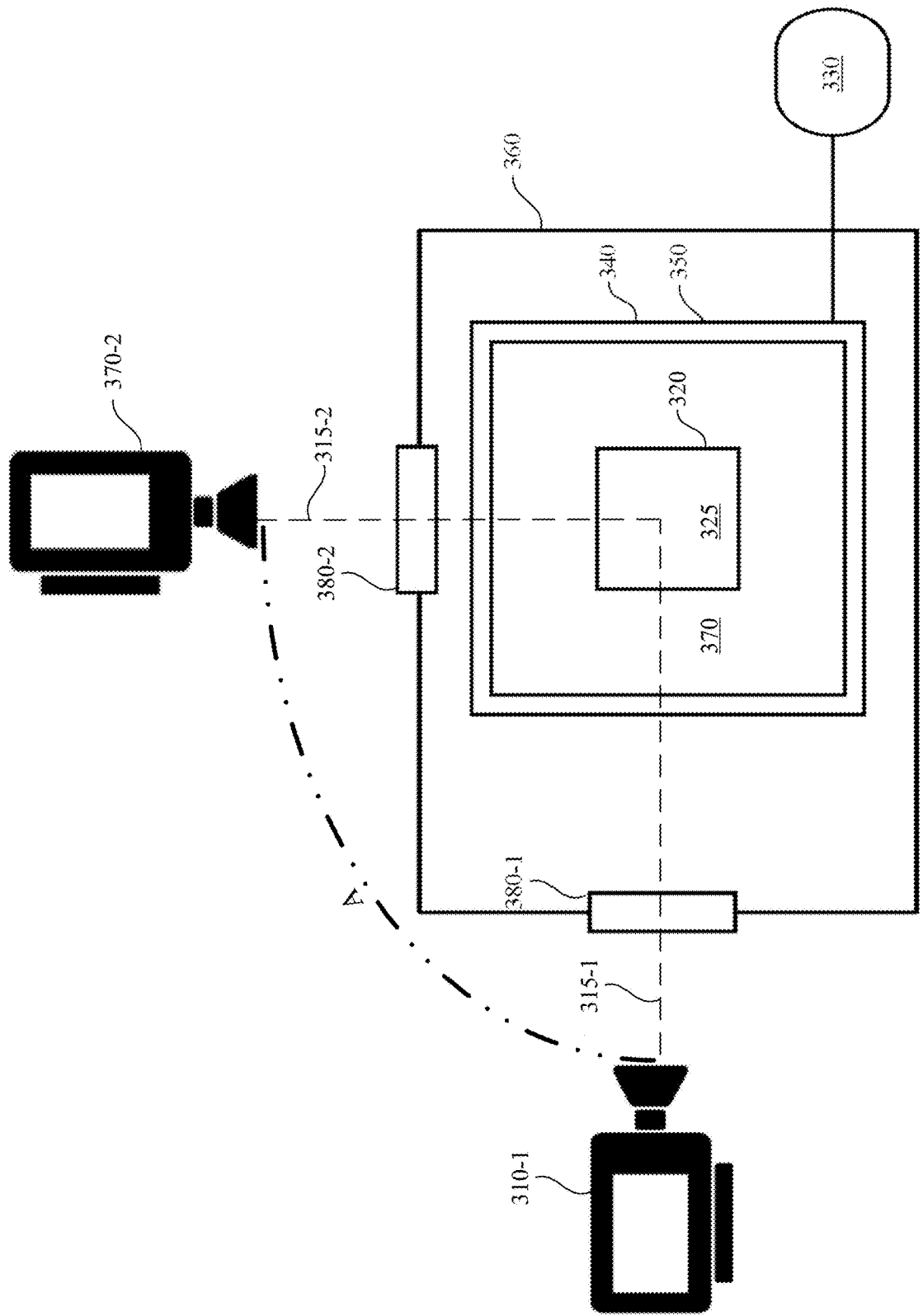
FIG. 5 illustrates a top view of another 3D printer system, in accordance with an embodiment of the present disclosure.
Figure 6:
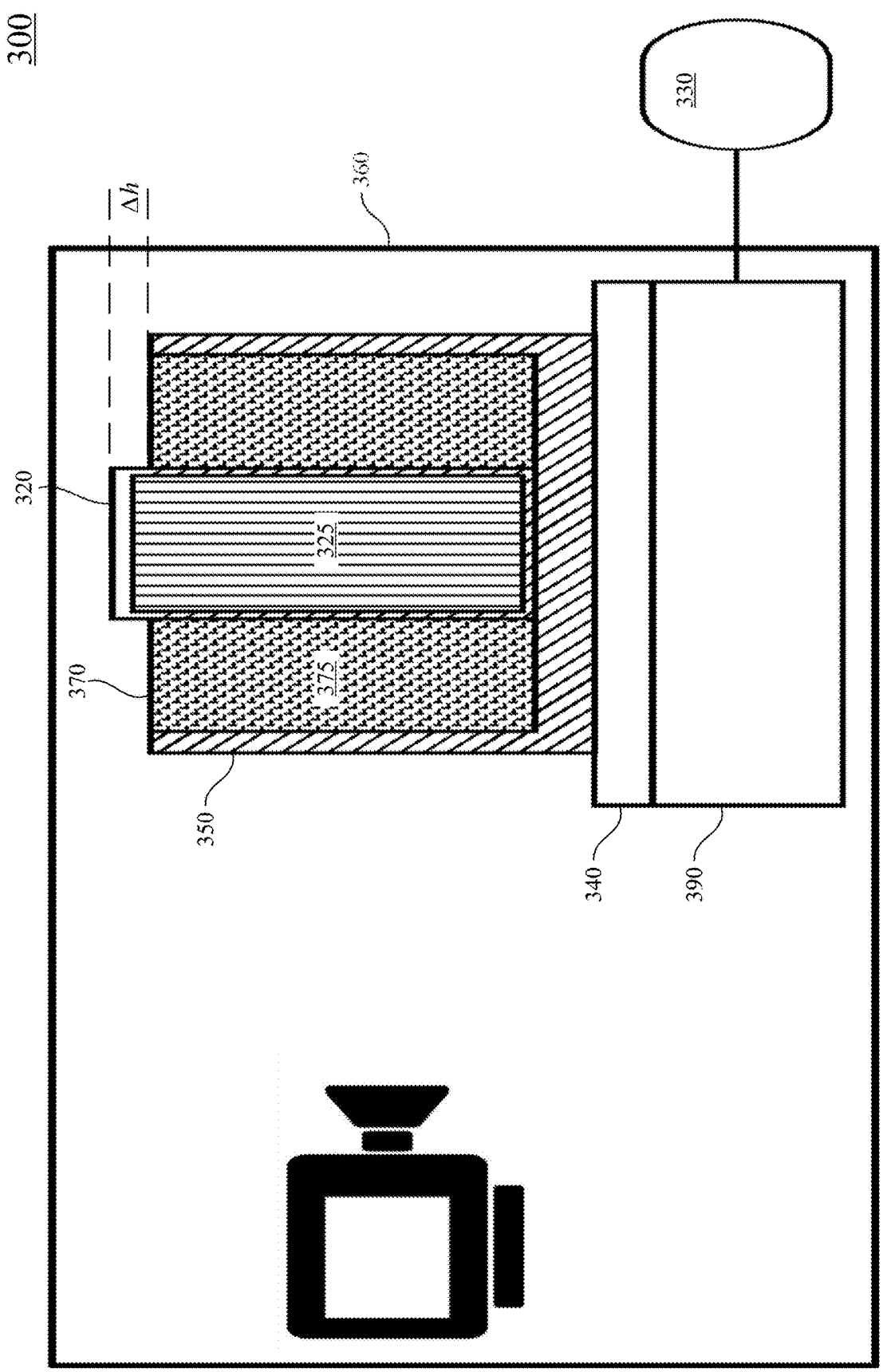
FIG. 6 illustrates a cross-sectional side view of yet another 3D printer system, in accordance with an embodiment of the present disclosure.

Furthermore, the 3D printer system 300 includes a resin enclosure (e.g., resin enclosure 320 of FIG. 3, resin enclosure 320 of FIG. 4, resin enclosure 320 of FIG. 5, rein enclosure 320 of FIG. 6, resin enclosure 320 of FIG. 7, etc.). In some embodiments, the resin enclosure 320 is made of a first material that has a high degree of transmissibility for light emitted by the one or more sources of actinic radiation 310. By having this high degree of transmissibility, refraction of the light emitted by the one or more sources of actinic radiation 310 is not only reduced but also easily accounted for when determining an optical path 315 of the light emitted by the one or more sources of actinic radiation 310. Said otherwise, the resin enclosure 320 is transmissive to the one or more sources of actinic radiation 310, which allows for the actinic radiation to transmit through the resin enclosure 320 and active polymerization of a resin 325 accommodated by the resin enclosure. In this way, light emitted by the one or more sources of actinic radiation 310 is capable of passing through the resin enclosure 320 due to its transmissivity. Accordingly, this greatly reduces a burden of determining (e.g., by logic 216 of printing control module of FIG. 2) one or more optimal measurements associated with manufacturing an object 750 at the 3D manufacture system 300. Furthermore, in some embodiments, the index that has an index of refraction that matches or approximately matches glass. As a non-limiting example, some such optical measurements include a matching index of refraction (MIR) between at least the resin enclosure 320 and the resin 325 accommodated by the resin enclosure 320. Moreover, in some embodiments, these optimal measurements include a particle image velocimetry (PIV) that evaluates a velocity field of a region of flow of the resin 325 and/or a laser Doppler velocimetry (LDV) that evaluates a Doppler shift in one or more sources of actinic radiation 310 to determine a velocity of the region of the resin 325. Additional details and information regarding determining one or more optical measurements can be found at Song et al., 2015, "Matching-index-of-refraction of Transparent 3D Printing Models for Flow Visualization," Nuclear Engineering and Design, 284, pg. 185, which is hereby incorporated by reference in its entirety.

In this way, in some embodiments, the resin enclosure 320 includes a material that has a first index of refraction that is the same, or substantially the same, as a second index of refraction of glass. Furthermore, in some such embodiments, the material of the resin enclosure 320 is transmissive the light emitted by the one or more sources of actinic radiation 310. As a non-limiting example, in some embodiments, the material of the resin enclosure 325 is transmissive to ultraviolet (UV) light, which allows for curing of the resin 325 by UV light emitted from the one or more sources of actinic radiation 310. For instance, in some embodiments, the resin enclosure 320 is made of: glass with about 1.52 refractive index; quartz with about 1.55 refractive index; silica including fused silica with about 1.45 refractive index, borosilicate glass with about 1.45 refractive index (e.g., Pyrex by Corning Inc., Corning, New York), a silica-boron trioxide glass with about 1.45 refractive index, (e.g., Vycor by Corning Inc., Corning, New York); or sapphire. In some embodiments, the resin enclosure 320 is made of a material that is selected based on a desired coefficient of thermal expansion. Use of such a material ensures that the volume of the resin enclosure 320 does not overtly change when heated or cooled and, therefore, does not further deform the optical path 315 between the resin 325 and the one or more sources of actinic radiation 310. One skilled in the art will appreciate that wide domain of materials having a high transmissivity to light are applicable for the resin enclosure 320 of the present disclosure. Additional details and information regarding the materials of the resin enclosure 320 can be found at Molby et al., 1949, "Index of Refraction and Coefficients of Expansion of Optical Glasses at Low Temperatures," JOSA, 39 (7), pg. 600; Amini et al., 2012, "An investigation of matched index of refraction technique and its application in optical measurements of fluid flow," Experiments in Fluids, 53 (6), pg. 2011, each of which is hereby incorporated by reference in its entirety.

In some embodiments, the resin enclosure 320 is symmetric. For instance, in some embodiments, the resin enclosure 320 includes a cylindrical body that is hollow, which provides an interior of the resin enclosure 320 that is configured to accommodate the resin 325 and an exterior of the resin enclosure 320 that includes an initial point of interception for the resin enclosure 320 of the optical path 315. In some embodiments, the cylindrical body of the resin enclosure is a right cylinder, which simplifies determining the optical path 315 from a respective source of actinic radiation 310 to one or more voxels in the resin 325. However, the present disclosure is not limited thereto. In some embodiments, the resin enclosure 320 includes a polygonal shape, such as a rectangular, or box, shape that is defined by a plurality of faces and a plurality of edges interconnecting the plurality of faces.

Furthermore, in some embodiments, a volume of the interior of the resin enclosure 320 is in a range from about $1*10^{-3}$ liters (L) to about $5*10\ 10^{-3}$ L, from about $1*10^{-3}$ L to about $5*10\ 10^{-3}$ L, from about $1*10^{-2}$ L to about $5*10\ 10^{-1}$ L, from about $1*10^{-1}$ L to about 1 L, from about 5 L to about 10 L, from about $5*10^{1}$ L to about $1*10\ 10^{3}$ L, or a combination thereof. In some such embodiments, the volume of the interior of the resin enclosure 320 is a maximum volume of the resin 325. One skilled in the art will appreciate that a wide domain of ranges of volumes for the interior of the resin enclosure 320 are applicable to the systems, methods, and devices of the present disclosure depending on a respective 3D printer system and/or an object 750.

Moreover, the 3D printer system 300 includes a temperature control system (e.g., temperature control system 330 of FIG. 3). The temperature control system 330 is configured to control a temperature of the 3D printer system 300 by way of the temperature control system 330 being in thermal communication, such as conductive communication, with the resin enclosure 320. Accordingly, the temperature control system 330 is configured to maintain a temperature of the resin enclosure 320 at or below a predetermined sub-ambient chilled state, such as by exchange heat from the resin enclosure 320. In this way, in some embodiments, the temperature control system 330 includes an interface that in contact with the resin enclosure 320 and/or a rotary base plate 340 of the 3D printer system 200. For instance, in some embodiments, the interface includes a planar or cylindrical surface of the 3D printer system 300 that physically interfaces with a lower end portion of the resin enclosure 320, such as a bottom planar surface of the resin enclosure 320. However, the present disclosure is not limited thereto. Accordingly, the temperature control system 330 allows a designer of the systems, methods, and devices of the present disclosure to regulate a temperature of the resin enclosure 320 and, therefore, the resin 325 accommodated by the resin enclosure with improved granularity and, in some embodiments, to previously unobtainable low temperatures for use with VAM techniques.

Furthermore, in some embodiments, the temperature control system 330 is configured maintain a temperature of the media 375, such as by heat exchange with the outer glass enclosure 350. This control of the temperature of the media 375 allows the 3D printer system 300 to at least ensure that the index of refraction of the media 375 is the same as the resin enclosure 320, which improves a quality of manufacture of the object 750 at the 3D printer system 300, similar to the regulation of the temperature of the resin 325 by the temperature control system 300.

More particularly, in some embodiments, the temperature control system 330 includes a thermoelectric cooler, which applies a voltage across the thermoelectric cooler to create a temperature differential and, therefore, a voltage difference across the thermoelectric cooler, which transfers heat from the resin enclosure, either directly or indirectly, to the thermoelectric cooler. However, the present disclosure is not limited thereto. For instance, in alternative embodiments, the temperature control system 330 includes a cryogenic cooler, which uses a fluidic refrigeration cycle including a fluidic coolant. In some embodiments, the fluidic coolant of the cryogenic cooler is made of the same material as the media 375. However, the present disclosure is not limited thereto. In some embodiments, the fluidic coolant of the cryogenic cooler includes ethylene, propane, nitrogen, or helium. As a non-limiting example, in some embodiments, the fluidic coolant of the cryogenic cooler includes water, one or more brine solutions, polyethylene glycol, dry ice, dry ice and one or more solvent combinations, liquid nitrogen, liquid helium, or the like. Accordingly, the temperature control system 330 allows for granular, accurate, and precise control of the temperature of the 3D printer system 300, which is at or below ambient temperature, ideally below a melting temperature of the resin 325, allowing greatly improved manufacture quality of the object 750 at the 3D printer system 300.

Furthermore, in some embodiments, the temperature control system 330 is configured to maintain a temperature of the media 375, such as by indirect contact (e.g., by way of the outer glass container 350) with the temperature control system. For instance, in some embodiments, when the temperature control system 330 includes the cryogenic cooler and/or a heat source, the temperature of the media 375 is controlled by fluidic heat exchange. In alternative embodiments, when the temperature control system 330 includes the thermoelectric cooler, the temperature of the media 375 is controlled by solid state heat exchange. By maintaining the temperature of the media 375, the 3D printer system 300 is allowed to at least ensure that the index of refraction of the media 375 matches, or substantially matches (e.g., matches within 10 percent, within 5 percent, or within 1 percent) the index of refraction of the resin enclosure 320 due to a temperature dependence of the refractive index of the media 375. From this, the 3D printer system 300 allows for the manufacture of the object 750 with improved qualities (e.g., precision, etc.).

Additionally, the 3D printer system 300 includes a control circuit 335. In some such embodiments, the object library 210 and/or the printer control module 214 of the computer system 200 is subsumed by, or replicated by, the control circuit 335 of the 3D printer system 300. The control circuit 335 in electrical communication with the one or more sources of actinic radiation 310 and the temperature control system 330, which allows for control of one or more states (e.g., power states) of the one or more sources of actinic radiation 310 and the temperature control system 330. In some embodiments, the control circuit 335 is further in electrical communication with the rotary base plate 340 of the 3D printer system 300, which allows for further control of one or more states of the rotary base plate. Accordingly, the control circuit 335 includes one or more non-transitory logics (e.g., first non-transitory logic 216-1, second non-transitory logic 216-2, etc. of FIG. 2) that is configured to control one or more mechanical and/or electrical aspects of the 3D printer system 300. For instance, in some embodiments, the control circuit 335 includes the first non-transitory logic 216-1 to switch the one or more sources of actinic radiation 310 to the powered state when one or more threshold criteria is satisfied, such as when a temperature of the 3D printer system is satisfied. By way of example, in some such embodiments, at least one threshold criteria in the one or more threshold criteria is a requirement that the temperature control system 330 is in a predetermined state that causes the resin enclosure 320 to be below a temperature associated with the 3D printer system 300, such as below the melting temperature of the resin 325 or the glass transition temperature of the resin 325. In some embodiments, the second non-transitory logic 216-2 is configured to switch the one or more sources of actinic radiation 310 to the unpowered state when one or more threshold criteria is not satisfied, such as when the resin enclosure 320 is above the temperature associated with the 3D printer system 300, which interrupts or terminates, at least in part, manufacture of an object 750 at the 3D printer system 300.

As such, in some embodiments, the at least one threshold criteria is a requirement that the temperature control system 330 is in a predetermined state. This predetermined state causes the resin enclosure 320 to be below or above a temperature associated with the 3D printer system 300. In some embodiments, the temperature associated with the 3D printer system 300 is an ambient temperature. In alternative embodiments, the temperature associated with the 3D printer system 300 is based on one or more material properties 208 associated with a coolant of the thermal control system 300 or the resin 325 of the 3D printer system 300. For instance, in some embodiments, the predetermined state is an elevated state above a melting temperature of the resin 325. In some such embodiments, when the resin 325 is above the melting temperature, the apparent viscosity of the resin 325 (e.g., at 1 Hz) increases as temperature decreases, which causes the resin 325 to resists flow. From this, the temperature control system 300 allows for a reduction in manufacturing errors due to buoyancy, gravity, chemical diffusion, and the like that occur when manufacturing an object using VAM techniques.

In some embodiments, the predetermined state is a first cooled state below a melting temperature of the resin 325. In some such embodiments, when the resin 325 is below the melting temperature, the resin 325 has an apparent viscosity that causes the resin 325 to behave like a solid (e.g., at 1 Hz). Moreover, in some embodiments, in this predetermined state below the melting temperature, limited molecular diffusion occurs within the resin 325 even though base materials of the resin (e.g., prepolymer) can "wiggle," which allows for limited motion. From this, in some embodiments, the resin 325 forms certain structural arrangements (e.g., crystallinity arrangements).

In some embodiments, the predetermined state is a second cooled state below a glass transition temperature of the resin 325. In some such embodiments, when the resin 325 is below the glass transition temperature, the resin 325 has no molecular mobility and the polymer chains are rigid (e.g., no "wiggling"). Accordingly, in some embodiments, this second cooled states allows the resin 325 to kinetically lock in a thermodynamically unfavorable arrangement, which allows for preventing crystallinity arrangements from forming.

In some embodiments, the resin 325 has a distinct melting temperature and a distinct glass transition temperature, such that the melting temperature is different than the glass transition temperature. In alternative embodiments, the melting temperature is the same as the glass transition temperature, such as when the resin 325 includes a silicon rubber. Accordingly, in some embodiments, having the resin 325 include a material with a low glass transition temperature, such as in polysiloxane, is preferable.

For instance, in some embodiments, the temperature associated with the 3D printer system 300, which the temperature of the resin enclosure 320 is below, is based on a boiling point of the coolant of the thermal control system 300 of the 3D printer system 300. As a non-limiting example, in some embodiments, the coolant of the temperature control system 330 of the 3D printer system 300 is liquid helium. Accordingly, at 1 atmosphere pressure (atm), a boiling point defined by a material property 208 of the coolant of the temperature control system 330 of liquid helium is about −269° C. However, the present disclosure is not limited thereto. For instance, in some embodiments, the coolant of the temperature control system 330 of the 3D printer system 300 is liquid nitrogen. Accordingly, at 1 atm, the boiling point defined by the material property 208 of the coolant of the thermal control system 330 of liquid nitrogen is about −196° C.

Moreover, in some embodiments, the coolant of the temperature control system 330 of the 3D printer system 300 is designed to cool a resin 215 that produces a first polymer, such as polysiloxane. Accordingly, at 1 atm, the boiling point defined by the material property 208 of the coolant of the temperature control system 330 in such instances is about −150° C. More generally, in some embodiments, the coolant of the temperature control system 330 of the 3D printer system 300 is designed to cool the resin 325 that is a second polymer. Accordingly, at 1 atm, in some such embodiments the boiling point defined by the material property 208 of the coolant of the temperature control system 330 is about −100° C. Moreover, in some embodiments, the coolant of the temperature control system 330 of the 3D printer system 300 is a water-based coolant of the temperature control system 330, such as brine. Accordingly, at 1 atm, the boiling point defined by the material property 208 of the coolant of the temperature control system 330 of the water-based coolant is about −4° C. Additionally, in some embodiments, the coolant of the temperature control system 330 of the 3D printer system 300 is an organic material. Accordingly, at 1 atm, the boiling point defined by the material property 208 of the coolant of the temperature control system 330 of the organic material is about 4° C. One skilled in the art will appreciate that the systems, methods, and devices of the present disclosure are not limited thereto. Furthermore, in some embodiments, the coolant of the temperature control system 330 includes liquid oxygen. Accordingly, at 1 atm, the boiling point defined by the material property 208 of the coolant of the temperature control system 330 of the liquid oxygen is about −183° C. in some embodiments, the coolant of the temperature control system 330 includes liquid methane. Accordingly, at 1 atm, the boiling point defined by the material property 208 of the coolant of the temperature control system 330 of the liquid methane is about −161° C. Said otherwise, in some embodiments, the at least one threshold criteria is a requirement that the temperature control system 330 is in a predetermined state that causes the resin enclosure 320 to be below about 4° C., about, about −4° C., about −100° C., about −150° C., about −196° C., or about −269° C., each of which correlates to a boiling point material property 208 of a coolant of the temperature control system 330 of the 3D printer system 300 or the melting temperature or the glass transition temperature of the resin 325.

In some embodiments, the temperature control system 330 is configured to regulate a temperature of the resin enclosure 320, such as in accordance with one or more non-transitory logics 216 instructed by a computer system 200 (e.g., through communication networks 106 of FIG. 1) associated with the 3D printer system 300. In some such embodiments, this regulation of the temperature of the resin enclosure 320 is in accordance with an operating range having a lower limit and an upper limit. In some embodiments, the lower limit and/or the upper limit is defined by a user of the 3D printer system, an administrator of the computer system 200, one or more material properties 208, or a combination thereof. For instance, in some embodiments, the upper limit of the operating range defines a first logic 216-1 of the temperature control system 330 and the lower limit defines a second logic 216-2 of the temperature control system 330. More particularly, in some embodiments, the lower limit is about 4° C., about −4° C., about −100° C., about −150° C., about −196° C., or about −296° C.

In some such embodiments, the upper limit is about room temperature (e.g., about 20° C. to about 25° C.), about 100° C., about 120° C., or about 200° C.

In some embodiments, the 3D printer system 300 is a volumetric system 3D printer system 300. In some embodiments, the 3D printer system 300 is a holographic 3D printer system 300. With the holographic 3D printer system 300, a 3D intensity distribution appears as a 3D image in space, which is then used to initiate the photopolymerization of the resin 325 to form an object 750. Additional details and information regarding the holographic techniques used with the 3D printer system 300 can be found at Lee et al., 2021, "Three-Dimensional (3D) Printing Implemented by Computer-Generated Holograms for Generation of 3D Layered Images in Optical Near Field," Photonics, 8 (7), pg. 286, which is hereby incorporated by reference in its entirety. In some embodiments, the 3D printer system 300 is a tomographic 3D printer system, which couple each source of actinic radiation 310 to a transport mechanism that allows each source of actinic radiation 310 to translate and/or rotate about the resin enclosure 320. Additional details and information regarding the tomographic techniques used with the 3D printer system 300 can be found at Loterie et al., 2020, "High-resolution Tomographic Volumetric Additive Manufacturing," Nature Communications, 11 (1), pg. 1, which is hereby incorporated by reference in its entirety. Moreover, in some embodiments, the 3D printer system 300 is a xolographic 3D printer system, which is a dual wavelength (e.g., dual color) additive manufacture technique that uses one or more photoswitchable photoinitiators to induce local polymerization inside the resin 325 upon linear excitation. This inducing of the polymerization inside the resin 235 is by intersecting a first optical path 315-1 of a first source of actinic radiation 310-1 of a first wavelength and a second optical path 315-2 of a second source of actinic radiation 310-2 of a second wavelength different than the first wavelength. Additional details and information regarding the xolographic techniques used with the 3D printer system 300 can be found at Regehly et al., "Xolography for Linear Volumetric 3D Printing," Nature, 588 (7839), pg. 620, which is hereby incorporated by reference in its entirety.

In some embodiments, the 3D printer system 300 includes one or more digital micromirror devices (DMD), which is configured to alter a shape of a beam, or optical path 315, emitted by the one or more sources of actinic radiation 310. More particularly, the DMD of the 3D printer system 300 to configured to direct the optical path 315 emitted by of a respective source of actinic radiation towards a target with a configurable cross-section defined, at least in part, by DMD. The DMD includes a plurality of mirrors disposed on a surface of the 3D printer system 300, such as an interior surface or a lower interior face of the vacuum enclosure 360. In some embodiments, the plurality of mirrors is in a range of from about $1 \cdot 10^3$ mirrors to about $1 \cdot 10^6$ mirrors, from about $1 \cdot 10^4$ mirrors to about $1 \cdot 10^6$ mirrors, from about $1 \cdot 10^4$ mirrors to about $9 \cdot 10^5$ mirrors, from about $1 \cdot 10^4$ mirrors to about $7 \cdot 10^5$ mirrors, or from about $5 \cdot 10^4$ mirrors about $5 \cdot 10^5$ mirrors. In some embodiments, the DMD is a commercial digital micromirror device, such as a Mirrorcle Integrated MEMS Mirrors (A5M24.1-2400AL).

In some embodiments, a resolution of an object 750 (e.g., a voxel resolution) manufactured by the 3D printer system 300 of the present disclosure is in a range from about 10 microns (μm) to about 50 μm (e.g., 53 μm), from about 40 μm to about 100 μm, from about 75 μm to about 250 μm, from about 200 μm to about 300 μm, or from about 250 μm to 500 μm, from about 400 μm to about 1,000 μm, from about 1 millimeter (mm) to about 10 mm, from about 10 mm to 100 mm, or a combination thereof.

In some embodiments, the 3D printer system 300 further includes a rotary base plate (e.g., rotary base plate 340 of FIG. 3, rotary base plate 340 of FIG. 4, rotary base plate 340 of FIG. 5, rotary base plate 340 of FIG. 6, etc.), which is configured to rotate about an axis of the rotary base plate 340 by way of a rotate mechanism of the rotary base plate 340. Accordingly, the resin enclosure 320 is disposed on the rotary base plate 340, such as on an upper end surface of the rotary base plate 340, which allows for the resin enclosure 320 to rest on the rotary base plate 340. In this way, a rotational motional provided by the rotary base plate 340 is transferred directly to the resin enclosure 320, which allows for the rotary base plate 340 and the resin enclosure 320 to rotate in unison. Said otherwise, in some embodiments, the resin enclosure 320 is radially symmetric about a longitudinal axis, and when the rotary base plate 340 spins, the rotational motional of the rotary base plate 340 causes the resin enclosure 320 to radially spin about the longitudinal axis.

In some such embodiments, the rotary base plate 340 includes one or more mating mechanisms that is configured to removably engage with a corresponding mating mechanism of the resin enclosure 320, such as a pin or magnet mating mechanism, which ensure that the rotary base plate 340 and the resin enclosure 320 rotate in unison as a collective body. By allowing the resin enclosure 320 to removably engage with the rotary base plate 340, the 3D printer system 300 enables one skilled in the art to manufacture a first object 750-1 utilizing a first media 375-1 and/or a first resin 325-1 and then manufacture a second object 750-2 at the 3D printer system 300 utilizing a second media 375-2 and a second resin 325. However, the present disclosure is not limited thereto.

In some embodiments, the control circuit further includes third non-transitory logic (e.g., logic 216-3 of printer control module 214 of FIG. 2) that causes the rotary base plate 340 and, therefore, the resin enclosure 320 to spin. From this spinning of the resin enclosure, the rate of spin of the In some embodiments, the third non-transitory logic 216-3 causes the rotary base plate 340 and the resin enclosure 320 to spin at a rate of from 10 rotations per minute (rpm) to about 50 rpm, from about 25 rpm to about 100 rpm, from about 50 rpm to about 500 rpm, from about 250 rpm to about 1,000 rpm, from about 750 rpm to about 2,000 rpm, form about 1,500 rpm to about 3,500 rpm, from about 3,000 rpm to about 4,500 rpm, or a combination thereof.

Moreover, in some embodiments, the temperature control system 330 is in thermal communication with the resin enclosure 320 through the rotary base plate 340. This structure of the 3D printer system 300 allows for the regulation of the temperature of the resin enclosure 320 through thermal exchange between the temperature control system 330 and the resin enclosure 320 by way of the rotary base plate 340. As described supra, in some embodiments, the thermal exchange is facilitated by an electronic thermal exchange, such as the thermoelectric cooler of the temperature control system 330, or by a fluidic thermal exchange mechanism, such as the cryogenic cooler of the temperature controller system 330.

In some embodiments, the 3D printer system 300 further includes an outer glass container (e.g., outer glass container 350 of FIG. 3, outer glass container 350 of FIG. 4, outer glass container 350 of FIG. 5, outer glass container 350 of FIG. 6, etc.). The outer glass container includes an interior (e.g., interior 370 of FIG. 3, interior 370 of FIG. 4, interior 370 of FIG. 5, interior 370 of FIG. 6, etc.), which is configured to accommodate the resin enclosure 320. In some embodiments, a first height of the resin enclosure 320 container is greater than a second height of the outer glass container 350, which creates a height differential (e.g., Δh of FIG. 6), which allows for a user of the 3D printer system to place and/or remove the resin enclosure 320 from the outer glass container 350 when the outer glass container 350 accommodates both a flowable media 375 and the resin enclosure 320. Moreover, the resin enclosure 320 is removably disposed in the interior of the outer glass container 350. In this way, a space that is not occupied by the resin enclosure 320 is filled with the media 375.

In some embodiments, outer glass container 350 is made of the same material as the resin enclosure 320. For instance, in some embodiments, the outer glass container 350 is made of: glass with about 1.52 refractive index; quartz with about 1.55 refractive index; silica including fused silica with about 1.45 refractive index, borosilicate glass with about 1.45 refractive index (e.g., Pyrex by Corning Inc., Corning, New York), a silica-boron trioxide glass with about 1.45 refractive index, (e.g., Vycor by Corning Inc., Corning, New York); or sapphire. In this way, in some embodiments, the outer glass container 350 is made of a material that has the first index of refraction that is the same, or substantially the same, as the second index of refraction of glass.

In some embodiments, the media 375 is air. In alternative embodiments, the media 375 is a vacuum. In some embodiments, the media 375 is a fluid that has a respective index of refraction that is substantially the same (e.g., within 10 percent, within 5 percent, within 1 percent) as glass, which has an index of refraction of about 1.52. As a non-limiting example, in some embodiments, the respective index of refraction of the media 375 is in a range of from about 1.3 to about 1.7, from about 1.35 to about 1.65, from about 1.4 to about 1.6, from about 1.45 to about 1.55, or a combination thereof. For instance, in some embodiments, the media 375 includes water, glycerin, glycerol, oil (e.g., silicon oil), benzyl benzoate, chlorobenzene, or a combination thereof. In some embodiments, the oil media 375 includes a fluorinated oil (e.g., perfluoro-polyether copolymers). In some embodiments, the media 375 is water, including deionized water or densified water. In some embodiments, the media 375 is a pure solvent or a solution with a solute present. As another non-limiting example, in some embodiments, the media 375 is a dielectric fluid including poly alpha olefine, synthetic ester, and the like, which allows for modifying optical characters of the media 375 when stimulated by an applied field (e.g., magnetic field or electric field by a control circuit 335). In this way, in some such embodiments, the media 375 is configured to minimize deformation of the optical path 315 by having the respective index of refraction that is the same or substantially the same as the resin enclosure 320. Moreover, in some embodiments, the media 375 is selected to ensure that the media 375 remains optically uniform across, such as ensuring no turbulence within the media 375 that gives rise to optical distortions at an interface of the media 375 and/or the resin enclosure 320.

Furthermore, in some embodiments, a volume of the interior of the outer glass container 350 is in a range from about $1*10^{-3}$ liters (L) to about $5*10^{-3}$ L, from about $1*10^{-3}$ L to about $5*10^{-3}$ L, from about $1*10^{-2}$ L to about $5*10^{-1}$ L, from about $1*10^{-1}$ L to about 1 L, from about 5 L to about 10 L, from about $5*10^{1}$ L to about $1*10$ $10^{3}$ L, or a combination thereof. In some such embodiments, the volume of the interior of the outer glass container 350 is a maximum volume of the media 375. One skilled in the art will appreciate that a wide domain of ranges of volumes for the interior of the outer glass container 350 are applicable to the systems, methods, and devices of the present disclosure depending on a respective 3D printer system 300 and/or an object 750.

In some embodiments, the 3D printer system 300 further includes a vacuum enclosure or dry box, hereinafter vacuum enclosure, (e.g., vacuum enclosure 360 of FIG. 2, vacuum enclosure 360 of FIG. 4, vacuum enclosure 360 of FIG. 5, vacuum enclosure 360 of FIG. 6, etc.). The vacuum enclosure 360 is configured to at least house the resin enclosure 320, which improves protection of the resin enclosure from contamination. For instance, in referring briefly to FIG. 3, in some embodiments the vacuum enclosure 360 forms a closed box that seals some or all of the 3D printer system 300 from an environment. However, the present disclosure is not limited thereto. In alternative embodiments, the vacuum enclosure 360 includes one or more open faces configured to abut an upper end surface, such as the upper end surface of the rotary base plate 340, which allows for the entire vacuum enclosure 360 to be placed about the some or all of the 3D printer system 300. Moreover, such a structure enables, in some embodiments, the vacuum enclosure 360 to rotate with the rotary base plate 340.

Additionally, in some such embodiments, the 3D printer system 300 includes a pump mechanism in communication with an interior of the vacuum enclosure 360. In this way, the vacuum enclosure 360 allows for forming, or substantially forming, a vacuum within the interior of the vacuum enclosure 360. Advantageously, this vacuum facilitated by the vacuum enclosure 360 reduces interference between contaminates interposing between the resin enclosure 320, or, similarly, the outer glass container 350, and optical path of a respective source of actinic radiation 310. From this structure, a quality (e.g., resolution) of an object 750 manufactured at the 3D printer system 300 is greatly improved. Furthermore, this vacuum facilitated by the vacuum enclosure 360 reduces an internal pressure within the vacuum enclosure 360, in comparison to an environmental pressure, which, in turn, lowers one or more characteristic thermal material properties 208 of the media 375 and the resin 325, such as the melting point of the resin 325. From the one or more lowered characteristic thermal material properties of the 208 of the media 375 and the resin 325, the quality of the object 750 manufactured at the 3D printer system 300 is greatly improved.

In some embodiments, the vacuum enclosure 360 includes a lens (e.g., lens 380 of FIG. 3, lens 380 of FIG. 4, etc.). The lens 380 is disposed in the optical path 315 between a first source of actinic radiation 310-1 and the resin enclosure 320, which allows the lens 380 to focus the optical path 315. For instance, in some embodiments, the lens 380 is disposed in a side wall of the vacuum enclosure 360. In this way, when the first source of actinic radiation 310-1 emits light onto, or towards, the resin enclosure 320 through the lens 380, the outer glass container 350, and the media 375 when the first source of actinic radiation 310-1 is in the powered state. In some embodiments, the lens 380 is, or includes, an objective lens that provides front-end image collection and optical zoom with high light collection efficiency. In some embodiments, the lens 380 provides an optical magnification in a range of from 1 to 100 optical magnification, from 2 to 100 optical magnification, from 4 to 100 optical magnification, from 4 to 80 optical magnification, or from 4 to 40 optical magnification. In some embodiments, the lens 380 is fixed with respect to a location of the resin enclosure 320. In some embodiments, the lens 380 is coupled to a motor that allows for modifying a position, such as an orientation, of the lens 380. In some embodiments, the motor provides one degree of freedom to the lens 380. Accordingly, in some embodiments, the lens 380 is fixed on a plane parallel to a corresponding plane of the resin enclosure 320 such that the optical path 315 of the one or more sources of actinic radiation 310, after passing through the lens 380 and, optionally, the outer glass container 350, is directed towards the resin enclosure with an angle of incidence of 0 degrees (°), or approximately about 0°. Furthermore, in some embodiments, the lens 380 includes one or more optical arranges for manipulating the light beam 315 including one or more filter, one or more mirrors, or a combination thereof.

In some embodiments, the control circuit 335 further includes a third non-transitory logic 216-3 that causes the rotary base plate 340 and, therefore, the resin enclosure 320 to spin. Moreover, the resin enclosure 320 is symmetrical about a longitudinal axis. Accordingly, the rotary base plate 340 spins, which causes the resin enclosure 320 to spin about the longitudinal axis. From this spinning of the rotary base plate 340 and the resin enclosure 320, the control circuit causes the resin 325 to spin about the longitudinal axis. Moreover, in some embodiments, this spinning of the resin 325 induces radial or mixed flow of the resin 325, which reduces a burden of evaluating flow conditions within the resin 325. Furthermore, the optical path 315 between the first source of actinic radiation 310-1 and the resin enclosure 320 causes light to enter the resin 325 enclosure radially, which allows for uniform exposure to the light.

Furthermore, in some embodiments, the control circuit 335 includes a fourth non-transitory logic 216-4 that causes the 3D printer system 300 to apply an electric or magnetic field to the media 375 in accordance with a determination that the reflective index of the media 375 satisfies a threshold reflective index (e.g., threshold reflective index of about 1.42). From this, the control circuit 335 allows the 3D printer system 300 to control the optical characteristics of the media 375 in accordance with the fourth non-transitory logic 216-4. For instance, in some such embodiments, when the media 375 includes a dielectric fluid, the fourth non-transitory logic 216-4 applies the electric or magnetic field to the media 375 in order to control a spatial distribution and/or orientation of a metallic suspension within the media 375. From this, the fourth non-transitory logic 216-4 controls the reflective index of the media 375 in accordance with variations in the electric or magnetic field applied to the media 375. Additional details and information regarding the control of the media that includes the dielectric fluid can be found at Golovin et al., 2009, "Electrically Reconfigurable Optical Metamaterials based on Colloidal Dispersion of Metal Nanorods in Dielectric Fluid," Applied Physics Letters 95 (25), pg. 254104; Komar et al., 2017, "Tunable Dielectric Metasurfaces Based on the Variation of the Refractive Index of the Environment," JETP Letters, 106 (11), print, each of which is hereby incorporated by reference in its entirety.

Furthermore, in some embodiments, the control circuit 335 includes a fifth non-transitory logic 216-5 that causes the 3D printer system 300 to switch temperature control system 330 to the powered state when one or more threshold criteria is satisfied. In some embodiments, at least one threshold criteria in the one or more threshold criteria is a requirement that the temperature control system 330 is in a predetermined state that causes the media 375 to be at a threshold temperature. From this, when the media 375 is a fluid, such as water, an increase in temperature of the media 375 lowers the refractive index of the media 375 allowing the refractive index of the media 375 to substantially match a corresponding refractive index of the resin enclosure 320. Additional details and information regarding the control of the refractive index of the media 375 by temperature can be found at Abbate, G., 2001, "The Temperature Dependence of the Refractive Index of Water," Journal of Applied Physics, 11 (8), pg. 1167; Thormählen et al., 1985, "Refractive Index of Water and its Dependence on Wavelength, Temperature, and Density," Journal of Physical and Chemical Reference Data, 14 (4), pg. 933, each of which is hereby incorporated by reference in its entirety.

In some embodiments, the vacuum enclosure 360 or dry box houses the one or more sources of actinic radiation 310, the resin enclosure 320, the outer glass container 350, the rotary base plate 340, or a combination thereof. For instance, in some embodiments, the one or more sources of actinic radiation 310 emit light onto the resin enclosure 320 through the outer glass container 350 and the media 375 when the one or more sources of actinic radiation 310 is in the powered state and housed by the vacuum enclosure 360, such as the 3D printer system 300 of FIG. 6. In alternative embodiments, the one or more sources of actinic radiation 310 emit light onto the resin enclosure 320 through the lens 380 of the vacuum enclosure 360, the outer glass container 350, the media 375 when the one or more sources of actinic radiation 310 is in the powered state and housed external to the vacuum enclosure 360, such as the 3D printer system 300 of FIG. 5.

Referring briefly to FIG. 7, in some embodiments, the 3D printer system 300 further includes one or more processors (e.g., CPU 274 of FIG. 2), memory (e.g., memory 292 of FIG. 2), and one or more programs (e.g., material library 206, object library 210, printer control module 214, or a combination thereof of FIG. 2) stored in the memory for execution by the one or more processors. In some such embodiments, the one or more programs include instructions for receiving user confirmation that a polymerizable resin material (e.g., resin 325 of FIG. 4) has been loaded into the resin enclosure 320. The one or more programs further include instructions for receiving user confirmation that the polymerizable resin material (e.g., resin 325 of FIG. 4) has been loaded into the resin enclosure 320 at a threshold capacity to satisfy manufacture of a corresponding object 750 at the 3D printer system 300. The polymerizable resin material includes a solvent. Furthermore, the one or more programs include instructions for instructing the control circuit 335 to maintain an amount of resin material 325 in the resin enclosure 320. In some embodiments, this maintaining the amount of resin material 325 includes instructing the control circuit 335 to maintain the resin material 325 at a first temperature that is below a melting temperature of the solvent using the temperature control system 330 (e.g., material property 208 of FIG. 2). Additionally, the one or more programs include instructions for instructing the control circuit 335 to power the one or more sources of actinic radiation (e.g., by a power supply of the 3D printer system 300). From this, a portion of the polymerizable resin material polymerizes into a predetermined preliminary object 750 shape. Moreover, this instructing the control circuit 353 includes instructing the control circuit 335 to supercritically evaporate or sublime the solvent out of the preliminary object 750 shape, which forms a predetermined 3D object.

In some embodiments, the first temperature causes an amount of the resin 325 that has not polymerized to have, or be at, an apparent viscosity of at least 100 Pa·s at 1 Hz. In some embodiments, the first temperature causes an amount of the resin 325 that has not polymerized to have, or be at, the apparent viscosity of from about 75 Pa·s to about 125 Pa·s at 1 Hz. In some embodiments, the first temperature causes an amount of resin 325 that has not polymerized to have, or be at, the apparent viscosity of at least $1*10^3$ Pa·s at 1 Hz, at least $1*10^4$ Pa·s at 1 Hz, at least $1*10^5$ Pa·s at 1 Hz, or at least $1*10^6$ Pa·s at 1 Hz.

One skill in the art of the present disclosure will appreciate that wide domain of materials is capable of being utilized as the resin 325 and/or the media 375 and/or the coolant of the temperature control system 330 of the 3D printer system 300.

For instance, in some embodiments, the resin 325 of the 3D printer system 300 is a ternary orthogonal photopolymer. For instance, in some embodiments, the resin 325 of the 3D printer system 300 is a polymeric material having at least one modulus gradient in a spatial direction that is produced in the resin 325 when formed as the object 750. In some embodiments, the resin 325 of the 3D printer system 300 is a polymeric material having a modulus gradient over one spatial direction, in which the modulus is measured in a plurality of voxels that is produced in the resin 325 when formed as the object 750. In some embodiments, the modulus is selected from a Young's modulus (E), a shear modulus or a modulus of rigidity (G), and a bulk modulus (K). In some embodiments, the modulus is storage modulus and/or loss modulus. In some embodiments, the modulus ranges from about $1*10^2$ Pascals (Pa) to about $1*10^{10}$ Pa. In some embodiments, the modulus ranges from about $1*10^2$ to Pa about $1*10^6$ Pa. In some embodiments, the modulus ranges from about $1*10^3$ to Pa about $1*10^5$ Pa. In some embodiments, the modulus ranges from about $1*10^5$ to Pa about $1*10^{10}$ Pa. In some embodiments, the polymeric material includes at least one group selected from —S—, —S—CH$_2$—CH(OH)—, and —CH$_2$—CH(—)—O—.

Additional details and information regarding the ternary orthogonal photopolymer resin 325 can be found at U.S. patent application Ser. No. 17/062,355, entitled "Ternary Orthogonal Photopolymers," filed Oct. 2, 2020, which is hereby incorporated by reference in its entirety.

In some embodiments, the resin 325 of the 3D printing system is a high molecular weight oligomer. In general, the viscosity of the polymer increases proportional to increases in the molecular weight of polymers. Moreover, in some embodiments, the high molecular weight species provide superior mechanical properties such as increased modulus.

In some embodiments, the resin 325 of the 3D printing system is a crystalline polymer. For instance, in some embodiments, the crystalline polymer possesses regions where the polymer chains fold and stack due to favorable interactions. One skilled in the art of the present disclosure will appreciate that there exist numerous mechanical and thermal advantages to crystalline and semicrystalline polymers when used for the resin 325. However, the crystalline regions make such resins 325 absorptive at wavelengths of actinic radiation, provided by the one or more sources of actinic radiation 310, necessary for photopolymerization of the resin 325. Yet, in some embodiments, the crystalline polymer resin 325 is made into a transparent, amorphous solids by heating the crystalline polymer resin 325 above a respective melting point material property 208 then rapidly quenching down the crystalline polymer resin 325 below the respective melting point material property 208. From this, a resulting amorphous solid now has appropriate photochemical behavior to be VAM processable. After printing by way of the 3D printer system (e.g., method 700 of FIG. 7), the solid object can then be brought above its melt point, cooled slowly and crystalized.

In some embodiments, the systems, methods, and devices of the present disclosure relate to directly printing foamed structures (e.g., having a cell size of less than about 50 microns) without a change in dimension. The polymer-void interface often scatters light to limit penetration depth. By starting with a photopolymer+solvent, freezing below the melting temperature for all components, printing, then supercritically evaporating or subliming the solvent out, a voided structure is obtained. The supercritical or sublimation process is necessary to remove the solvent without pore collapse or shape change due to surface tension.

In some embodiments, the systems, methods, and devices of the present disclosure relate to printing preceramic structures that do not crack during pyrolysis. Similar to other systems, methods, and devices described herein, a voided polymeric structure is obtained. In some embodiments, the polymer is a class of preceramics (e.g., siloxanes) that undergoes pyrolysis under appropriate conditions (e.g., temperature, atmosphere, etc.) to reduce the polymer to a ceramic (e.g., SiOC or SiC). While in other methods the pyrolysis process creates large shrinkage stresses that can break large objects, as described herein the voids accommodate the stresses during processing to avoid the structure breaking apart.

In some embodiments, the systems, methods, and devices of the present disclosure relate to printing high molecular weight oligomers. In some embodiments, one or more diluents is added to these materials to reduce viscosity to being suitable for printing. However, in some embodiments, these additives bleed out post printing and lead to dimensional change. Alternatively, the systems, methods, and devices of the present disclosure allow for building linear polymer chains from smaller species during printing of an object at the 3D printer system 300, but the increase in the number of reactions required to build high molecular weight units increases print time and often increases polydispersity.

In some embodiments, the systems, methods, and devices of the present disclosure relate to printing crystalline polymers. In general, in some embodiments, crystalline polymers are printed at the 3D printer system 300 via vat polymerization by using dilute crystalline polymers in photopolymers to create interpenetrating polymer networks. The crystalline component raises the viscosity, limiting the relative fraction of crystalline material that is printable. In some embodiments, as described supra, the 3D printer system 300 includes the temperature control system 300 that further includes a heat source configured to transfer heat to the resin enclosure and, therefore, the resin 325 to reduce this viscosity.

In some embodiments, the systems, methods, and devices of the present disclosure relate to printing preceramic structures that do not crack during pyrolysis. In some embodiments, the negative effects of shrinkage during pyrolysis are minimized by only reducing siloxanes to SiOC (and not further to SiC) and by printing lattice structures with voided structures already at the 3D printer system 300. Such issues with lattice structures are discussed herein but include printed resolution limitations and anisotropy.

In some embodiments, the systems, methods, and devices of the present disclosure relate to printing in broad areas of material space, such as those that include good ceramics, foams, crystalline materials, which were previously inaccessible to vat polymerization due to more complex architectures, by utilizing ultrahigh viscosity or solid state resins 325 of polymers below their melt temperature or glass transition temperature.

In some embodiments, when 3D printing ceramics via vat polymerization, issues generally related to processing a manufactured object 750. Accordingly, in some embodiments, the systems, methods, and devices of the present disclosure, the shape of a "green body" structure is formed, which is a weakly bound structure that, optionally, includes both ceramic nanoparticles and polymers, with light from the one or more sources of actinic radiation 310 and then process the green body structure in a furnace, which results in some material burning off (e.g., shrinkage). As such, one or more portions of an object 750 either do not reach the right elemental balance or the shrinkage stress breaks large objects apart. In some embodiments, these issues are solved as described herein by loading the resin 325 with more ceramic particles, which increases viscosity of the resin 325 but reduces the amount of shrinkage during thermal processing, or intentionally printing in small voids (e.g., through a frozen solvent in the resin 325 that is removed via sublimation control by the temperature control system 330, to accommodate shrinkage.

In some embodiments, the systems, methods, and devices of the present disclosure relate to the manufacture of objects from nanostructured elastomeric foams. In some embodiments, solvent molecules occupy the interstitial space in polymer networks of the resin 215 at the nanoscale (e.g., less than 500 nm). In some embodiments, if the solvent in the resin 325 is volatile, during evaporation, a surface tension of the solvent bubble in the polymer resin 325 causes the polymer chains to pull back and fill this void. However, solids and supercritical fluids do not possess the surface tension. Thus, in some embodiments, sublimation is used (e.g., solid-gas sublimation) via lyophilization to maintain voids in these interstitial areas. This results in a lower density, higher compliance, better thermally insulating structure, which is used to manufacture an object that utilizes haptic feedback. Moreover, the systems, methods, and devices of the present disclosure allow for metamaterial properties, such as zero index of refraction materials for optical cloaking.

In some embodiments, phase separation at length scales above the aforementioned alters optical properties and, thereby, photopolymerization depth. This is a primary limitation to crystalline materials. However, in some embodiments, objects 750 are melted to remove crystalline order and yield a transparent polymer melt, and/or quenched rapidly to kinetically trap the chains to prevent reordering. In some embodiments, photo crosslink is then used, and heat is applied to melt the resin 325 and then slowly cool the resin 325 to form the crystalline domains.

In some embodiments, the systems, methods, and devices of the present disclosure relate to printing Poly (ethylene glycol) diacrylate (PEGDA) resin 325 below its melting temperature. In some embodiments, the disclosure relates to printing silicone resin 325 below a glass transition temperature.

Additional details and information regarding using the resin 325 with the 3D printer system 300 can be found at Shusteff et al., 2017, "One-step Volumetric Additive Manufacturing of Complex Polymer Structures," Science Advances, 3 (12), eaao5496; Wang et al., 2020, "3D Printing of Viscoelastic Suspensions via Digital Light Synthesis for Tough Nanoparticle-Elastomer Composites," Advance Materials, 32 (25), pg. 2001646; Zhang et al., 2019, "Self-Healing Four-Dimensional Printing with an Ultraviolet Curable Double-Network Shape Memory Polymer System," ACS Applied Materials and Interfaces, 11 (10), pg. 10328; Wirth et al., 2020, "Highly Expandable Foam for Lithographic 3D Printing," ACS Applied Materials and Interfaces, 12 (16), pg. 19033; Eckel et al., 2016, "Additive Manufacture of Polymer Derived Ceramics," Science, 351 (6268), pg. 58; Cativa et al., "PEG-based Cross-linked Films with Aligned Channels: Combining Cryogenic Processing and Photopolymerization for the Design of Micro-patterned Oriented Platforms," DOI: 10.1039/C8ME00085A (Paper) Mol. Syst. Des. Eng., 4 (1), pg. 133, each of which is hereby incorporated by reference in its entirety.

REFERENCES CITED AND ALTERNATIVE EMBODIMENTS

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that includes a computer program mechanism embedded in a non-transitory computer-readable storage medium. For instance, the computer program product could contain instructions for operating the user interfaces described with respect to FIG. 2. These program modules can be stored on a CD-ROM, DVD, magnetic disk storage product, USB key, or any other non-transitory computer readable data or program storage product.

Many modifications and variations of this invention can be made without departing from its spirit and scope, as will be apparent to those skilled in the art. The specific embodiments described herein are offered by way of example only. The embodiments were chosen and described in order to best explain the principles of the invention and its practical applications, to thereby enable others skilled in the art to best utilize the invention and various embodiments with various modifications as are suited to the particular use contemplated. The invention is to be limited only by the terms of the appended claims, along with the full scope of equivalents to which such claims are entitled.

What is claimed is:

1. A three-dimensional printer system comprising:
    one or more sources of actinic radiation that is characterized at least by (i) a powered state in which the one or more sources of actinic radiation emit light and (ii) an unpowered state in which the one or more sources of actinic radiation is powered off;
    a resin enclosure that is transmissive to the one or more sources of actinic radiation;
    a temperature control system, in thermal communication with the resin enclosure, that is configured to maintain the resin enclosure at or below a predetermined sub-ambient chilled state;
    a rotary base plate, wherein the resin enclosure is on the rotary base plate and the temperature control system is in thermal communication with the resin enclosure through the rotary base plate; and
    a control circuit, in electrical communication with the one or more sources of actinic radiation and the temperature control system, wherein the control circuit comprises:
        a first non-transitory logic to switch the one or more sources of actinic radiation to the powered state when one or more threshold criteria is satisfied, wherein at least one threshold criteria in the one or more threshold criteria is a requirement that the temperature control system is in a predetermined state that causes the resin enclosure to be below a temperature associated with the three-dimensional printer system, and
a second non-transitory logic to switch the one or more sources of actinic radiation to the unpowered state when the one or more threshold criteria are not satisfied.

2. The three-dimensional printer system of claim 1, wherein the one or more sources of actinic radiation emit light within a wavelength range of 300-500 nm onto the resin enclosure when the one or more sources of actinic radiation is in the powered state.

3. The three-dimensional printer system of claim 1, wherein the temperature control system comprises a thermoelectric cooler or a cryogenic cooler.

4. The three-dimensional printer system of claim 1, wherein the at least one threshold criteria is a requirement that the temperature control system is in a predetermined state that causes the resin enclosure to be below about 4° C.

5. The three-dimensional printer system of claim 1, wherein the at least one threshold criteria is a requirement that the temperature control system is in a predetermined state that causes the resin enclosure to be below about −4° C.

6. The three-dimensional printer system of claim 1, wherein the at least one threshold criteria is a requirement that the temperature control system is in a predetermined state that causes the resin enclosure to be below about −100° C.

7. The three-dimensional printer system of claim 1, wherein the at least one threshold criteria is a requirement that the temperature control system is in a predetermined state that causes the resin enclosure to be below about −150° C.

8. The three-dimensional printer system of claim 1, wherein the at least one threshold criteria is a requirement that the temperature control system is in a predetermined state that causes the resin enclosure to be below about −196° C.

9. The three-dimensional printer system of claim 1, wherein the at least one threshold criteria is a requirement that the temperature control system is in a predetermined state that causes the resin enclosure to be below about −269° C.

10. The three-dimensional printer system of claim 1, wherein the temperature control system regulates a temperature of the resin enclosure in an operating range having a lower limit and an upper limit.

11. The three-dimensional printer system of claim 10, wherein the lower limit is about 4° C., about −4° C., about −100° C., about −150° C., about −196° C., or about −296° C. and the upper limit is about room temperature, about 100° C., about 120° C., or about 200° C.

12. The three-dimensional printer system of claim 1, wherein the three-dimensional printer system is a holographic, tomographic, volumetric, or xolographic three-dimensional printer system.

13. The three-dimensional printer system of claim 1, wherein the control circuit further comprises a third non-transitory logic that causes the rotary base plate and the resin enclosure to spin.

14. The three-dimensional printer system of claim 1, wherein the resin enclosure is radially symmetric about a longitudinal axis, and the rotary base plate spins, thereby causing the resin enclosure to radially spin about the longitudinal axis.

15. The three-dimensional printer system of claim 1, further comprising an outer glass container having an interior, wherein
the resin enclosure is made of glass,
the resin enclosure is in the interior of the outer glass container,
a space not occupied by the resin enclosure is filled with a media that has an index of refraction that matches or approximately matches glass, and
the outer glass container rests on the rotary base plate.

16. The three-dimensional printer system of claim 15, further comprising a vacuum enclosure that houses the resin enclosure, the outer glass container and the rotary base plate, wherein the vacuum enclosure comprises a lens in an optical path between a first source of actinic radiation and the resin enclosure and wherein the first source of actinic radiation emits light onto the resin enclosure through the lens, the outer glass container, and the media when the first source of actinic radiation is in the powered state.

17. The three-dimensional printer system of claim 16, wherein
the control circuit further comprises a third non-transitory logic that causes the rotary base plate and the resin enclosure to spin,
the resin enclosure is symmetrical about a longitudinal axis,
the rotary base plate spins, thereby causing the resin enclosure to spin about the longitudinal axis, and
the optical path between the first source of actinic radiation and the resin enclosure causes light to enter the resin enclosure radially.

18. The three-dimensional printer system of claim 15, further comprising a vacuum enclosure or dry box that houses the one or more sources of actinic radiation, the resin enclosure, the outer glass container and the rotary base plate, wherein the one or more sources of actinic radiation emit light onto the resin enclosure through the outer glass container and the media when the one or more sources of actinic radiation is in the powered state.

19. The three-dimensional printer system of claim 1, further comprising
one or more processors;
memory; and
one or more programs stored in the memory for execution by the one or more processors, the one or more programs comprising instructions for:
receiving user confirmation that a polymerizable resin material has been loaded into the resin enclosure, wherein the polymerizable resin material comprises a solvent;
instructing the control circuit to maintain an amount of resin material in the resin enclosure at a first temperature that is below a melting temperature of the solvent using the temperature control system; and
instructing the control circuit to power the one or more sources of actinic radiation thereby polymerizing a portion of the polymerizable resin material into a predetermined preliminary object shape and to supercritically evaporate or sublime the solvent out of the preliminary object shape thereby forming a predetermined three-dimensional object.

20. The three-dimensional printer system of claim 19, wherein the first temperature causes an amount of resin that has not polymerized to have an apparent viscosity of at least $1 \times 10^2$ Pa·s at 1 Hz, at least $1 \times 10^3$ Pa·s at 1 Hz, at least $1 \times 10^4$ Pa·s at 1 Hz, at least $1 \times 10^5$ Pa·s at 1 Hz, or at least $1 \times 10^6$ Pa·s at 1 Hz.

21. The three-dimensional printer system of claim 1, wherein a first source of actinic radiation in the one or more sources of actinic radiation is a LED light source.

22. The three-dimensional printer system of claim 1, wherein a first source of actinic radiation in the one or more sources of actinic radiation is a laser.

23. The three-dimensional printer system of claim 1, wherein
the one or more sources of actinic radiation is a single source of actinic radiation, the resin enclosure is radially symmetric,
an optical path between the single source of actinic radiation to enter the resin enclosure radially when the single source of actinic radiation is in the powered state.

24. The three-dimensional printer system of claim 1, wherein
the one or more sources of actinic radiation is a plurality of sources of actinic radiation, the resin enclosure is in the form of a box comprising a first face and a second face orthogonal to the first face,
a first source of actinic radiation in the plurality of sources of actinic radiation causes light to enter the resin enclosure by a first optical path through the first face when in the powered state, and
a second source of actinic radiation in the plurality of sources of actinic radiation causes light to enter the resin enclosure by a second optical path through the second face when in the powered state.

25. The three-dimensional printer system of claim 15, wherein the control circuit further comprises a fourth non-transitory logic that causes the control circuit to apply an electric or magnetic field to the media.

26. The three-dimensional printer system of claim 15, wherein the control circuit further comprises a fifth non-transitory logic configured to switch the one or more sources of actinic radiation to the powered state when one or more second threshold criteria is satisfied, wherein at least one second threshold criteria in the one or more second threshold criteria is a requirement that the temperature control system is in a predetermined state that causes the media to be at a temperature associated with the three-dimensional printer system.

27. The three-dimensional printer system of claim 15, wherein the outer glass container is made of glass, quartz, fused silica, borosilicate glass, silica-boron trioxide glass, or sapphire.

28. The three-dimensional printer system of claim 15, wherein the media comprises deionized water, glycerol, silicone oil, benzyl benzoate, chlorobenzene, or a combination thereof.

* * * * *